United States Patent
Sun et al.

(10) Patent No.: US 11,196,256 B2
(45) Date of Patent: Dec. 7, 2021

(54) METHODS AND SYSTEMS FOR A HOLISTIC FRAMEWORK FOR PARAMETER COORDINATION OF INTERCONNECTED MICROGRID SYSTEMS AGAINST DISASTERS

(71) Applicant: Mitsubishi Electric Research Laboratories, Inc., Cambridge, MA (US)

(72) Inventors: Hongbo Sun, Lexington, MA (US); Tong Huang, College Station, TX (US); Kyeong-Jin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 101 days.

(21) Appl. No.: 16/697,549

(22) Filed: Nov. 27, 2019

(65) Prior Publication Data
US 2021/0159695 A1 May 27, 2021

(51) Int. Cl.
*H02J 3/00* (2006.01)
*H02J 13/00* (2006.01)
*H02J 3/38* (2006.01)
*G05B 19/042* (2006.01)

(52) U.S. Cl.
CPC ............ *H02J 3/001* (2020.01); *G05B 19/042* (2013.01); *H02J 3/388* (2020.01); *H02J 13/00002* (2020.01); *H02J 13/00006* (2020.01); *G05B 2219/2639* (2013.01); *H02J 2203/20* (2020.01)

(58) Field of Classification Search
CPC ...... H02J 3/001; H02J 13/00002; H02J 3/388; H02J 13/00006; H02J 2203/20; G05B 19/042; G05B 2219/2639
See application file for complete search history.

(56) References Cited

U.S. PATENT DOCUMENTS

| | | | |
|---|---|---|---|
| 5,371,670 A * | 12/1994 | Lurie | G05B 11/42 700/37 |
| 6,141,672 A * | 10/2000 | Driendl | H03H 17/0294 708/320 |
| 6,532,454 B1 * | 3/2003 | Werbos | G05B 13/027 706/14 |
| 10,574,057 B2 * | 2/2020 | Kocarev | B60L 50/60 |
| 2012/0191439 A1 * | 7/2012 | Meagher | G06F 30/20 703/18 |
| 2013/0116989 A1 * | 5/2013 | Zhang | G06F 8/10 703/2 |

(Continued)

*Primary Examiner* — Ramesh B Patel
(74) *Attorney, Agent, or Firm* — Gennadiy Vinokur; Hironori Tsukamoto

(57) ABSTRACT

Systems and methods for coordinating network and control parameters of a power distribution system (PDS) with interconnected microgrids in response to a subset of interconnected microgrids entering island-mode due to a predicted future disaster, generating samples of network and control parameter combinations, determining optimal adjustments of network and control parameters with respect to the disaster condition, determining optimal set of network and control parameters to be reinforced or adjusted, activating the parameter adjustments and reinforcements on the determined tie lines and PCCs of the microgrids.

22 Claims, 15 Drawing Sheets

(56) References Cited

U.S. PATENT DOCUMENTS

| | | | |
|---|---|---|---|
| 2015/0149128 A1* | 5/2015 | Baone | G06F 30/20 |
| | | | 703/2 |
| 2016/0013652 A1* | 1/2016 | Li | H02J 9/061 |
| | | | 307/24 |
| 2016/0172838 A1* | 6/2016 | Luebke | H02H 3/006 |
| | | | 361/93.1 |
| 2016/0285269 A1* | 9/2016 | Majumder | H02J 3/381 |
| 2017/0077700 A1* | 3/2017 | Sun | H02J 3/06 |
| 2017/0256948 A1* | 9/2017 | Froehner | H02J 3/382 |
| 2018/0138710 A1* | 5/2018 | Kocarev | H02J 3/32 |
| 2019/0103743 A1* | 4/2019 | Sun | H02J 13/0086 |
| 2019/0311286 A1* | 10/2019 | Stadler | G06Q 50/06 |
| 2020/0003811 A1* | 1/2020 | Jaton | H02J 3/381 |
| 2020/0192336 A1* | 6/2020 | Wang | G05B 19/4184 |
| 2020/0241489 A1* | 7/2020 | Hassan | G05B 13/042 |

\* cited by examiner

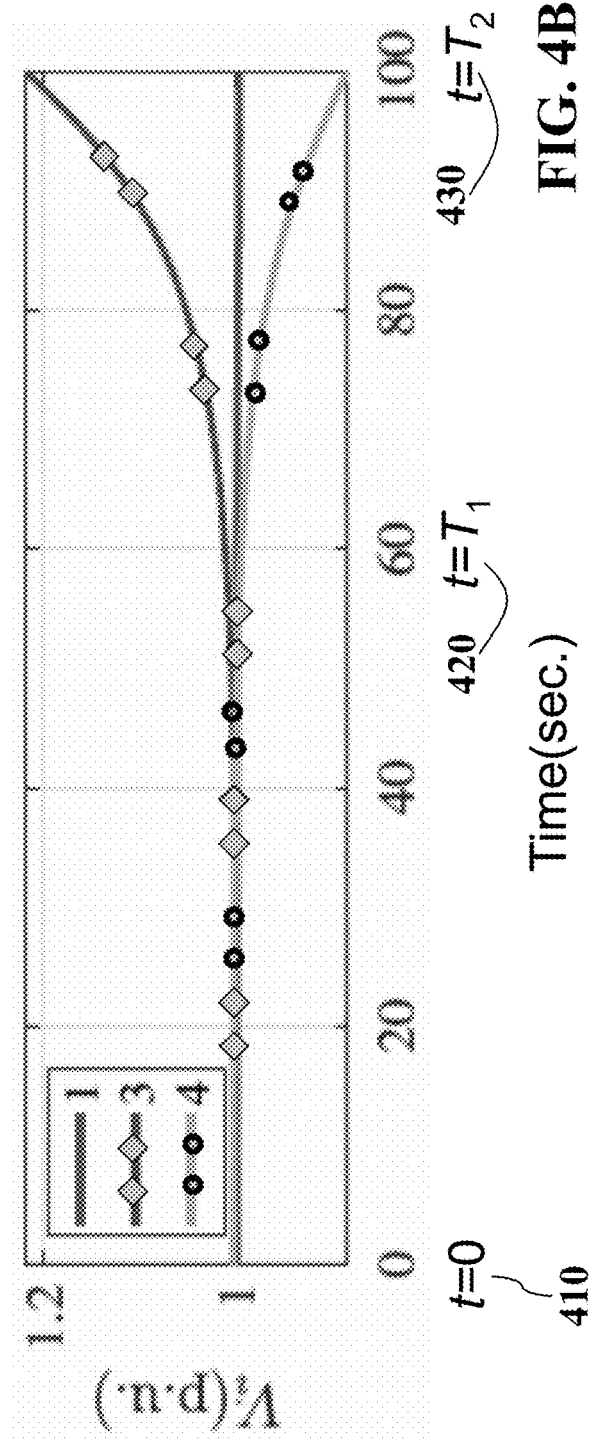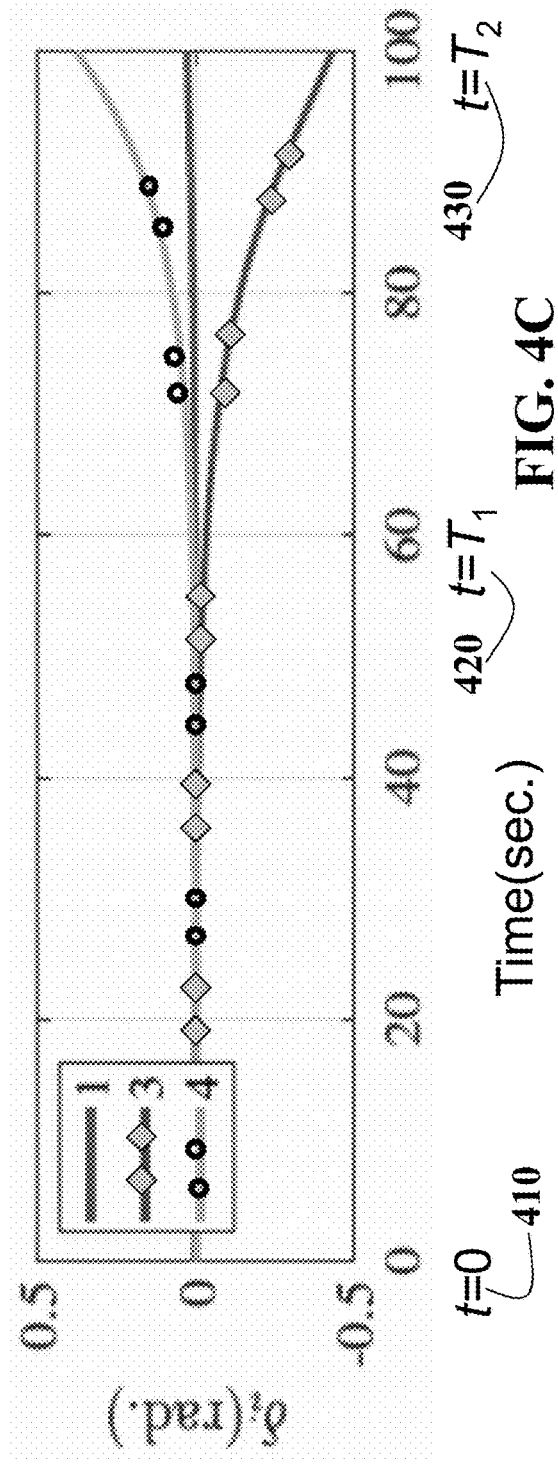
FIG. 4B
FIG. 4C

METHODS AND SYSTEMS FOR A HOLISTIC FRAMEWORK FOR PARAMETER COORDINATION OF INTERCONNECTED MICROGRID SYSTEMS AGAINST DISASTERS

FIELD

The present disclosure relates generally to electric power systems, and more particularly to a holistic framework for parameter coordination of interconnected microgrid systems against disasters.

BACKGROUND

Electric power grids are one of the most critical infrastructures to today societies, for example transportation, water supply, school, city halls, and airports all rely on the supply of electricity. A power grid can consist of generating stations that produce electrical power, high voltage transmission lines that carry power from distant sources to demand centers, and distribution lines that connect to consumers of the power, such as customers. The power grid is desired to keep light on all times. However, its security has been challenging by various events every day, such as natural disaster event (weather, earthquake, etc.), an intentional damaging event (terrorist attack, etc.) or an unintentional damaging event (plane crash, train wreck, etc.). Those events caused damage to at least a portion of the power grid, resulting in a potential of, a destabilization of or loss of, power in the system, which causes an interruption of suppling continuous power either immediately or sometime in a near future.

The increased frequency, duration, and intensity of extreme weather events pose severe threats to the power grid causing wide-area power outages primarily affecting in low-voltage and mid-voltage power distribution systems that contributes to majorities of the outages. Although weather-related power outages in the power grid have not been frequent, over the last few years, power outages are substantially increasing and their consequences are staggering. For example, in the United States in August and September of 2017, experienced 3 separate hurricanes Harvey, Irma and Maria hit, that resulted in a total of about 7.5 million customers in Texas and Florida without electricity. Considering that climate change in the future will produce more extreme weather conditions, this will bring an almost certain anticipation of future massive blackouts, as experienced in the past, and will occur more frequently in view of today's aging and stressed power distribution systems. Therefore, improving the resilience of power systems, specifically power distribution systems is imperative.

Resilience is defined as the ability of power distribution systems as a whole to absorb and adapt to disasters, rather than contribute to them. One promising way for increasing the resilience of power distribution systems is to configure a power distribution system as an interconnected microgrid system, and utilize the flexibility offered by the microgrids to reduce the disaster-induced impacts and speed up the restoration process. A microgrid can be regarded as a group of interconnected loads, distributed energy resources (DER) and storages within clearly defined electrical boundaries that acts as a single controllable entity with respect to the power distribution system. The microgrid can connect and disconnect from the power distribution system to enable it to operate in both grid-connected or island-mode.

The distribution system operators (DSOs) coordinate the operations of interconnected microgrids through controlling the setpoints at the points of common coupling (PCCs) between microgrids and the power distribution system. These microgrids usually operate at grid-connected mode, and DSOs achieve global operation optima through regulating the PCC setpoints of each microgrid. When abnormal operation conditions happen, such as the power distribution system loses desirable functions due to natural disasters, or when severe faults occur that result from extreme weather hazards, the normal operations of the power distribution system become compromised, where some microgrids can proactively enter the island-mode. Through strategically switching between grid-connected and island-mode for microgrids, DSOs can maximally improve the resilience of the power distribution system. To implement these operation actions, DSOs usually have to examine their feasibility at different time scales to guarantee the system not only having a reasonable steady-state performance but also a satisfactory dynamic performance.

Presently, there are some conventional operation strategies that utilize the microgrid infrastructures and associated operation mode changes to enhance operational resilience for the power distribution system, such as microgrid sectionalizing, blackout restoration, and resource allocation. However, those strategies are mainly focused on issues in a time scale of quasi-steady state, and do not consider dynamical behavior at a finer time scale due to the complexity and scale of problems. As a result, the desired operational goals might fail due to being based on these conventional steady-state studies and insufficient examination of microgrids' stability. For example, a planned operation scheme has been proved as feasible through power flow studies. However, it might fail due to many stability related reasons, for example the tie lines between microgrids might fail to deliver the required power due to stability constraints, or the system fails to achieve desirable setpoints at timely manner due to the limitations of controllers. Therefore, it is critical that microgrids' dynamical behavior be further analyzed to examine dynamic performance of interconnected microgrids in a much faster time scale in the presence of future pending disasters.

Dynamic performances of the power distribution system are determined by its network characteristics, such as series impedances and phase angle shift on the distribution lines, shunt admittances at the buses, and the initial settings and tunable ranges of its controllers. Conventionally, the DSOs mainly rely on adjusting the parameters of controllers to improve system dynamic performance. With the developments of the FACTS (Flexible Alternating Current Transmission System) techniques, the network parameters can also conveniently be modified which provide more flexibility for the DSOs regulating dynamic behaviors of the system. Although such technical advances further complicate the parameters coordination problem by enlarging the search space, DSOs may find more effective but less costly controlling scheme to achieve desirable dynamic performance in the presence of natural disasters by coordinating network and control parameters together. There are some dynamic performance related efforts existing, but mainly focused on parameter estimation and tuning targeted to one of specific-type controller or device. For example, US20150100282A1 discloses a method for generator dynamic model parameter estimation and tuning using online data and subspace state space model. The method uses a constraint optimization problem to find the best set of tuned parameter values to match given field-measurement data. However, these methods are based on a critical assumption that the output responses must be known before the parameter set can be estimated and tuned. Unfortunately, it is impossible for a DSO getting the output responses before the event actual occurring when examining dynamic performance of a planned operation scenario based on a predicted future event.

Accordingly, there is need to for more advanced and implementable methods for stability-oriented pre-disaster preparation of power distribution system, in particular, the need for parameter coordination of interconnected microgrids against future pending disasters.

SUMMARY

The present disclosure relates generally to electric power systems, and more particularly to parameter coordination of interconnected microgrid systems against disasters.

The present disclosure relates to systems and methods for a holistic framework for network and control parameter coordination of a power distribution system with interconnected microgrids against further pending disasters. The network parameters of the power distribution system include the series resistances, series reactance and series phase shift of tie-lines between microgrids, and the shunt conductance and susceptances at the points of common coupling (PCCs) of microgrids. Within the given ranges, those parameters can be adjusted through associated line compensators installed on the tie lines or bus compensators at the PCCs. The compensators may need to be reinforced or replaced if wider tuning ranges are required. The control parameters of the power distribution system refer to the parameters of PCC controllers, such as tracking time constants and droop gains if a droop control strategy is applied to the controlling of PCCs. Similarly, the control parameters can be adjusted within the given tuning ranges to fit system operation needs, and new controllers may be needed, or current ones have to be reinforced for a wider tuning range. Such that, embodiments of the present disclosure can reconfigure the power distribution system with interconnected microgrids to accomplish desirable dynamic performance using a holistic framework for parameter coordination of the power distribution system against future pending disasters. The holistic framework offers a set of procedures for the DSOs to directly/indirectly assess asymptotical stability at the pre-determined equilibrium points, efficiently prioritize system parameters based on the parameters' significance in terms of system dynamics, and systematically updating the selected critical parameters, such that pre-designed equilibrium points of the interconnected microgrid system can achieve asymptotically stable during a natural disaster event. Wherein when the set of microgrids entering island-mode are known, the pre-designed equilibrium points of remaining microgrids can be determined through power flow analysis, and generation re-dispatch and load shedding may be used if necessary. The determined settings of equilibrium points may include the voltage magnitudes, the voltage phase angles, the active power injections, and the reactive power injections at all PCCs of reaming microgrids.

At least one realization of the present disclosure includes the need for systematic coordination of network and control parameters of the power distribution system to achieve asymptotical stability at predetermined equilibrium points for a disaster event with less efforts and better performance. Wherein the systematic coordination of network and control parameters is accomplished by first prioritizing candidate parameters according their significance to the system stability, and then selecting the critical parameters to be adjusted, and at last determining the best adjusting scheme for selected critical parameters to enable the system asymptotically stable at the pre-determined equilibrium points during the disaster. We realized that both network parameters and control parameters can impact the stability of interconnected microgrids, and adjusting them coordinately generates an effective plan, requires less effort and costs less to implement, over any known disaster related conventional methods. The predetermined equilibrium points can be achieved, if the predetermined equilibrium points pass, both steady state examination and stability examination.

Some embodiments of the present disclosure provide a parameter prioritizing procedure and a parameter tuning procedure under a predicted future disaster scenario, through randomly sampling of parameter combination using a Monte Carlo simulation method, and verifying the corresponding asymptotical stability using a time-domain simulation method.

Other embodiments of the present disclosure provide the parameter prioritizing procedure and the parameter tuning procedure under a disaster scenario through randomly sampling of parameter combination using the Monte Carlo simulation method, and verifying the corresponding asymptotical stability using either a Linear Matrix Inequality (LMI) based method wherein the power flow induced nonlinearities are replaced with two linear bounds, or a Sum of Square (SOS) based method wherein the power flow induced nonlinearities are replaced with two polynomial bounds.

Some advantages and benefits of the embodiments of the present disclosure can include an examination of dynamic performance of networked microgrids in a much faster time scale in the presence of future pending disasters and address today's power restoration time critical needs by overcoming the conventional method problems of being very time-consuming, which make the conventional methods unequipped for operation with the power restoration time critical needs. Further, distribution system operators (DSO) can strategically adjust their operation strategies for enhancing the grid's resilience, by making the operational adjustments, whereas DSO using the conventional practices fail to strategically adjust their operation strategies for enhancing the grid's resilience, due to failing to make the necessary operational adjustments in time.

According to an embodiment of the present disclosure, a system for coordinating parameters including network parameters and control parameters of a power distribution system (PDS), the PDS includes interconnected microgrids. Each microgrid is connected through a point of common coupling (PCC), and each microgrid is connected with adjacent microgrids through tie lines. The system including a computing hardware system including computing devices communicatively linked to the PDS via an information network. Wherein at least one computing device of the computing devices is configured to receive a predicted-future event and a subset of microgrids entering island-mode due to the predicted-future event, along with current tunable parameters and their associated tunable ranges in the PDS via the information network. Generate samples of network and control parameter combinations for the PDS that initiate asymptotical stability of the PDS, based on a comparison of the current tunable parameters and their associated tunable ranges and a simulation model with a predefined deviation threshold, to obtain tunable parameters. Prioritize each parameter in the tunable parameters according to a level of importance to the asymptotical stability of the PDS, and select a subset of tunable parameters to be tuned, based on a comparison of the prioritized tunable parameters and a system stability model with a predetermined importance threshold. Determine a tuning scheme for the subset of tunable parameters to facilitate asymptotically stability with respect to the predicted-future event using the tunable parameters and associated tunable ranges of the subset of tunable parameters. Activate the tuning scheme on tie lines and PCCs for each of the remaining interconnected microgrids in the PDS.

According to another embodiment of the present disclosure, a method for coordinating network and control parameters of a power distribution system (PDS) with interconnected microgrids in response to a subset of interconnected microgrids entering island-mode due to a predicted future disaster, wherein the PDS is connected with each microgrid through a point of common coupling (PCC), and each microgrid is connected with adjacent microgrids through tie lines, the method comprising: receiving disaster forecast and the subset of microgrids to be isolated via the information network, generating samples of network and control parameter combinations among whole network and control parameter space; determining post-disaster equilibrium points for remaining microgrids and evaluating associated asymptotically stability for each sample of parameter combination; determining optimal adjustments of network and control parameters with respect to the disaster condition using a current set of tunable parameters and associated tunable ranges; determining optimal set of network and control parameters to be reinforced, when desirable dynamic performance fails to be achieved using current set of parameters and associated tunable ranges; determining critical set of network and control parameters to be adjusted among set of all adjustable parameters when total amount of parameter adjustments is subject to a pre-determined threshold; activating the parameter adjustments and reinforcements on the determined tie lines and PCCs of the microgrids in the PDS.

According to an embodiment of the present disclosure, a system for coordinating parameters including network parameters and control parameters of a power distribution system (PDS). The PDS includes microgrids interconnected through a point of common coupling (PCC) via each microgrid, and each microgrid is connected with adjacent microgrids through tie lines. The system includes an information network in communication with a data gathering network having sensors, a processor and a memory having a database including executable models associated with the PDS. Wherein the processor selectively executes steps stored in the memory, such that the processor is configured to receive a predicted-future event from the information network, and in response. Acquire monitoring data from the data acquisition network for a list of interconnected microgrids entering island-mode in the PDS, due to the predicted-future event. Identify current adjustable parameters and their associated tunable ranges of the PDS, for inclusion in an execution of at least one simulation model, to create a system stability model. Generate samples of network and control parameter combinations that initiate asymptotical stability for the PDS based on a comparison of identified current adjustable parameters and their associated tunable ranges and the at least one simulation model with a pre-defined deviation threshold, to obtain tunable parameters. Prioritize each parameter in the tunable parameters according to a level of importance to the asymptotical stability of the PDS, then select a subset of tunable parameters to be tuned, based on a comparison of the prioritized tunable parameters and the system stability model with a predetermined importance threshold. Determine a tuning scheme for the subset of tunable parameters to facilitate asymptotically stability with respect to the predicted-future event using the adjustable parameters and associated tunable ranges of the subset of tunable parameters. Activate the tuning scheme on tie lines and PCCs for each of the remaining interconnected microgrids in the PDS.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4B and FIG. 4C are schematics illustrating an evolution of voltage magnitude (FIG. 4B) and phase angle (FIG. 4C) after the microgrid 2 enters the islanding mode, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to providing systems and methods for coordinating and reconfiguring network and control parameters of power distribution systems with interconnected microgrids against disasters.

Embodiments of the present disclosure provide a holistic framework for parameter coordination of a power distribution system with interconnected microgrids against natural disasters. The framework address how to maintain the stability of the power distribution system after some of interconnected microgrids forced to enter island-mode due to disasters through parameter reconfiguration of tie line compensators between microgrids and PCC interface controllers of microgrids. Embedded Monte-Carlo simulation with the stability assessment, the framework can systematically coordinate parameters such that post-disaster equilibrium points of microgrid interconnections are asymptotically stable. Three different stability assessment methods are provided, including time-domain simulation based method, LMI based method, and SOS based method.

Figure 1A:
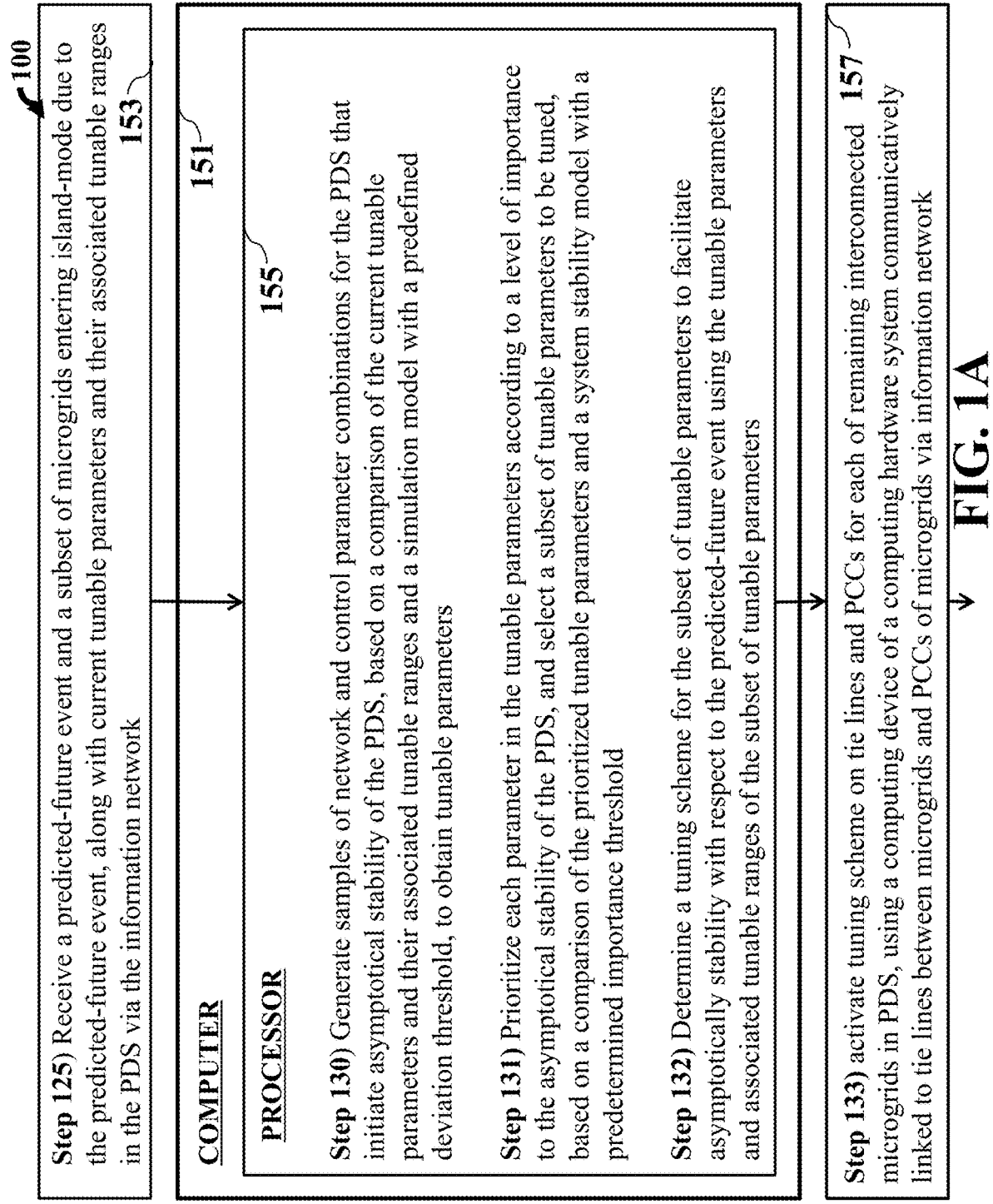
FIG. 1A is a block diagram illustrating a method for coordinating network and control parameters of a power distribution system with interconnected microgrids, according to embodiments of the present disclosure.

FIG. 1A is a block diagram illustrating a method for coordinating network and control parameters of a power distribution system with interconnected microgrids, according to embodiments of the present disclosure.

Step 125 includes method 100 receiving a predicted-future event and a subset of microgrids entering island-mode due to the predicted-future event, along with current tunable parameters and their associated tunable ranges in the PDS via the information network 153.

Step 130 includes method 100 using a hardware processor 155 of a computer 151 to generate samples of network and control parameter combinations for the PDS that initiate asymptotical stability of the PDS, based on a comparison of the current tunable parameters and their associated tunable ranges and a simulation model with a predefined deviation threshold, to obtain tunable parameters.

Still referring to FIG. 1A, step 131 includes method 100 using the hardware processor 155 to prioritize each parameter in the tunable parameters according to a level of importance to the asymptotical stability of the PDS, and select a subset of tunable parameters to be tuned, based on a comparison of the prioritized tunable parameters and a system stability model with a predetermined importance threshold.

Step 132 includes method 100 using the hardware processor 155 to determine a tuning scheme for the subset of tunable parameters to facilitate asymptotically stability with respect to the predicted-future event using the tunable parameters and associated tunable ranges of the subset of tunable parameters.

Still referring to step 133 of FIG. 1A, using a computer device 157 to activate tuning scheme on tie lines and PCCs for each of remaining interconnected microgrids in PDS, using a computing device of a computing hardware system communicatively linked to tie lines between microgrids and PCC of microgrids via information network 153.

Figure 1B:
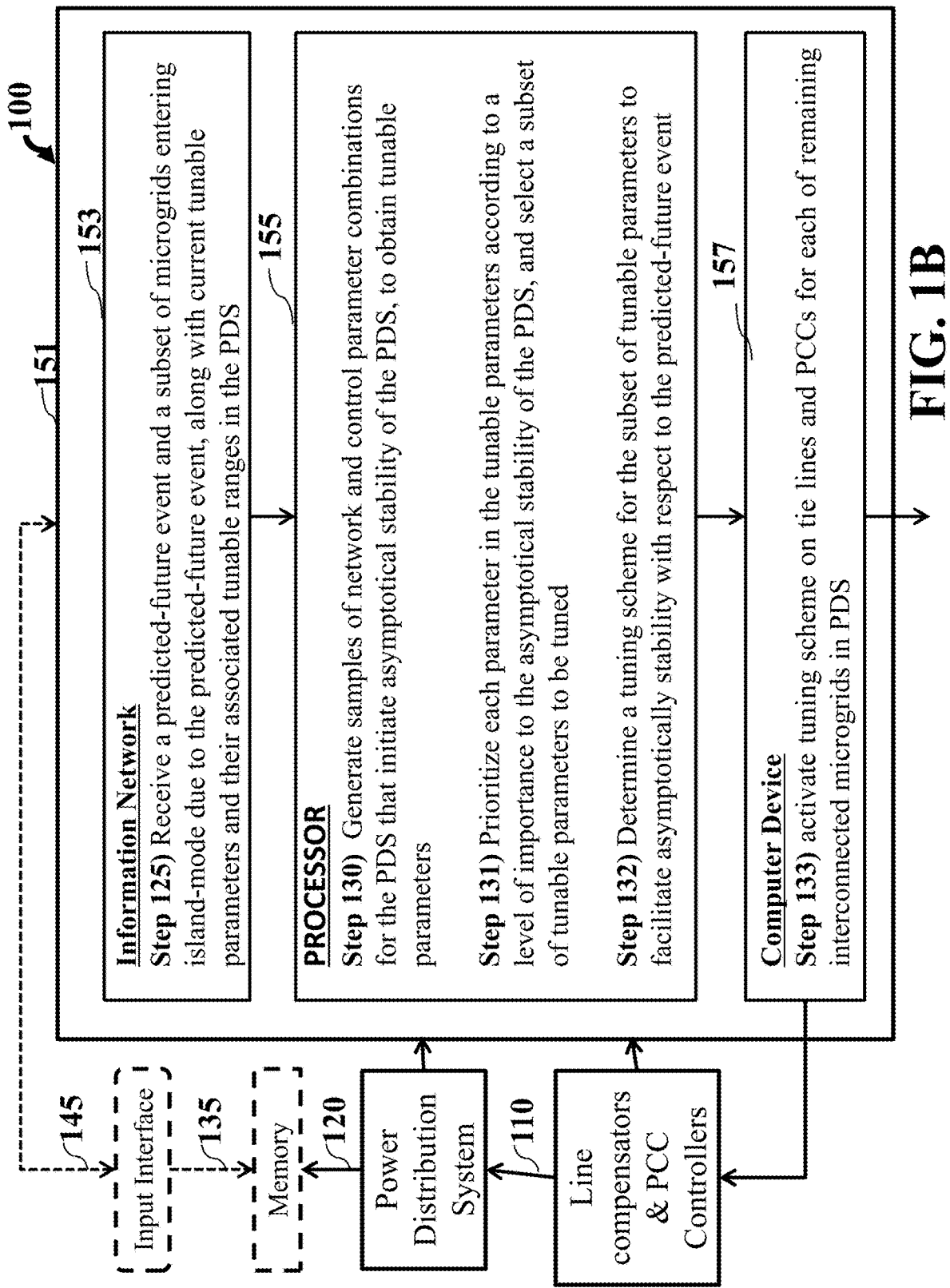
FIG. 1B is a block diagram illustrating the system of FIG. 1A, implemented using some components of the system, according to embodiments of the present disclosure.

FIG. 1B is a block diagram illustrating the system of FIG. 1A, wherein the system is implemented using some components, according to embodiments of the present disclosure. FIG. 1B can include a hardware processor 155 in communication with an input interface 145, a memory 135, an information network 153, a computer device 157. The computer device 157 can be connected to the set of line compensators and PCC interface controllers 110 that installed in the power distribution system 120. The computer 151 can control the set of line compensators and PCC interface controllers 110 as well as can send and receive information. It is contemplated the hardware processor 155 can include two or more hardware processors depending upon the requires of the specific application. Certainly, other components may be incorporated with method 100 including input interfaces, output interfaces and transceivers.

Still referring to FIG. 1B, aspects of the system 100 include step 125 of receiving a predicted-future event and a subset of microgrids entering island-mode due to the predicted-future event, along with current tunable parameters and their associated tunable ranges in the PDS.

Step 130 includes generating samples of network and control parameter combinations for the PDS that initiate asymptotical stability of the PDS, based on a comparison of the current tunable parameters and their associated tunable ranges and a simulation model with a predefined deviation threshold, to obtain tunable parameters.

Step 131 includes prioritizing each parameter in the tunable parameters according to a level of importance to the asymptotical stability of the PDS, and selecting a subset of tunable parameters to be tuned, based on a comparison of the prioritized tunable parameters and a system stability model with a predetermined importance threshold.

Step 132 includes determining a tuning scheme for the subset of tunable parameters to facilitate asymptotically stability with respect to the predicted-future event using the tunable parameters and associated tunable ranges of the subset of tunable parameters.

Step 133 includes using a computer device 157 to activate tuning scheme on tie lines and PCCs for each of remaining interconnected microgrids in PDS, using a computing device of a computing hardware system communicatively linked to tie lines between microgrids and PCC of microgrids via information network 153.

Figure 2A:
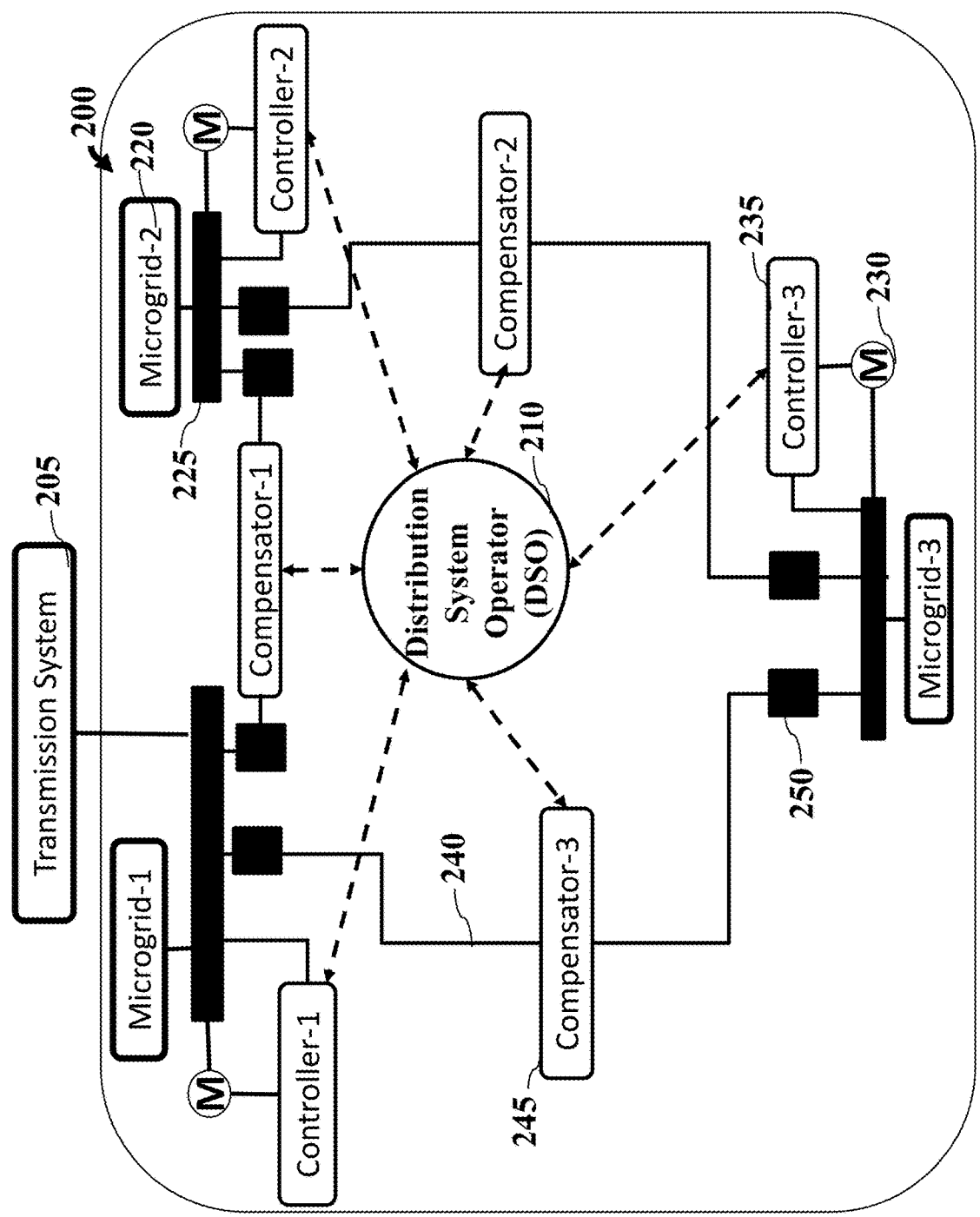
FIG. 2A is a schematic illustrating for a power distribution system with interconnected microgrids, according to embodiments of the present disclosure.
Figure 2B:
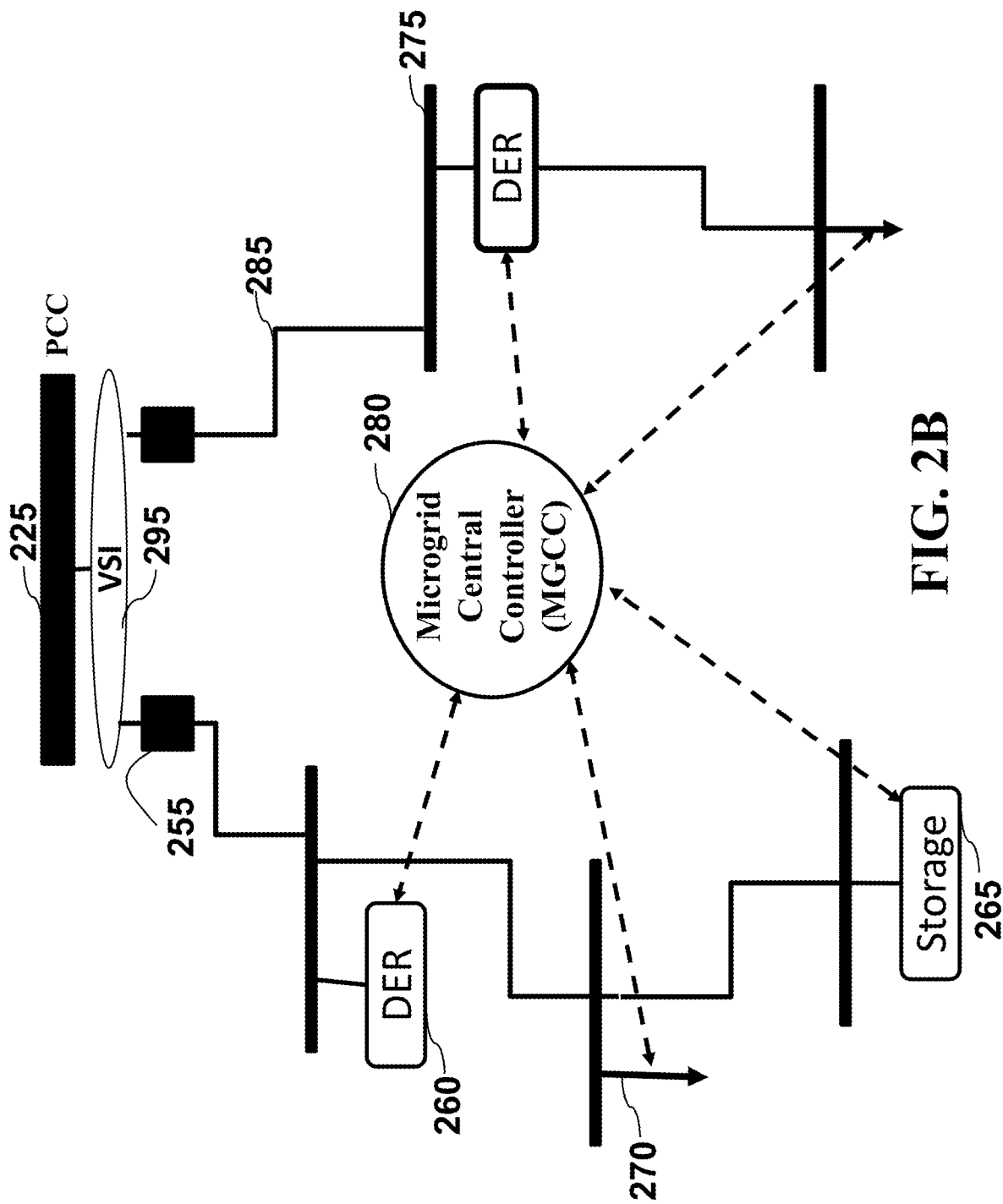
FIG. 2B is a schematic illustrating for a microgrid in the power distribution system, according to embodiments of the present disclosure.

FIG. 2A is a schematic illustrating the components for a power distribution system with interconnected microgrids, and FIG. 2B is a schematic illustrating for a microgrid connected with the power distribution system, according to embodiments of the present disclosure.

The power distribution system 200 shown in FIG. 2A connects with transmission system 205, and multiple microgrids 220. Each microgrid is connected to the system through a point of common coupling (PCC) 225. Each PCC 225 is monitored by a measurement device 230, such as a phasor measurement unit (PMU), and controlled by a PCC interface controller 235. The PCC interface 295 (shown in FIG. 2B) can be power electronic based device, such as a voltage source inverter (VSI), or a synchronous generator (SG). The microgrids interconnected each other through tie lines 240, and the tie line 240 can be open or closed through breaker/switches 250 installed at its terminals. The series impedance and phase shift parameters of tie lines can be adjusted through the setting of series line compensator 245.

It may also have shunt compensator at the PCCs (not shown in the figure) to adjust shunt admittance at each PCC.

The power distribution system is operated by a distribution control operator (DSO) 210. Based on the operation needs, the operator 210 can communicate with PCC interface controllers 235 and line compensators 245 to adjust the parameter settings or reinforce related controllers/compensators to enhance their tuning capacities.

The micorgrid 220 shown in FIG. 2B connects to the power distribution system through the PCC 225. It can switch its operation mode between grid-connected mode and island-mode through operating the breakers or switches 255 connected to the PCC 225. It can pickup the power from local distributed energy resources (DER) 260, and storages 265 from distribution buses 275, and deliver it to the loads 270 through distribution lines 285. A DER is an electrical generation source to produces electric power. Typical examples of DERs include solar panels, wind farms and micro-turbines. A load is an electrical component or portion of a circuit that consumes electric power, such as are appliances and lights. The microgrid central controller (MGCC) 280 is responsible for controlling each individual DER, storage and load. DSO 210 only needs to coordinate each microgrid interface, and leave the generation dispatch and control task to MGCC 280 for each microgrid 220.

Mathematical Description of Interconnected Microgrids and Stability Issues Due to Natural Disasters This disclosure addresses the problem that the DSOs face when they prepare the operation scenarios when the disasters are approaching, that is how to reconfigure and coordinate system network and control parameters before disasters such that the reconfigured distribution system has desirable steady-state and dynamic performances during the disaster. The power flow studies are commonly used to evaluate system steady-state performance by checking if power flow converges and the result is within a satisfactory range. The stability assessment is used to evaluate the system dynamic performance by verifying whether an asymptotically stability can be achieved at the pre-designed equilibrium point through tuning the system parameters.

Figure 3:
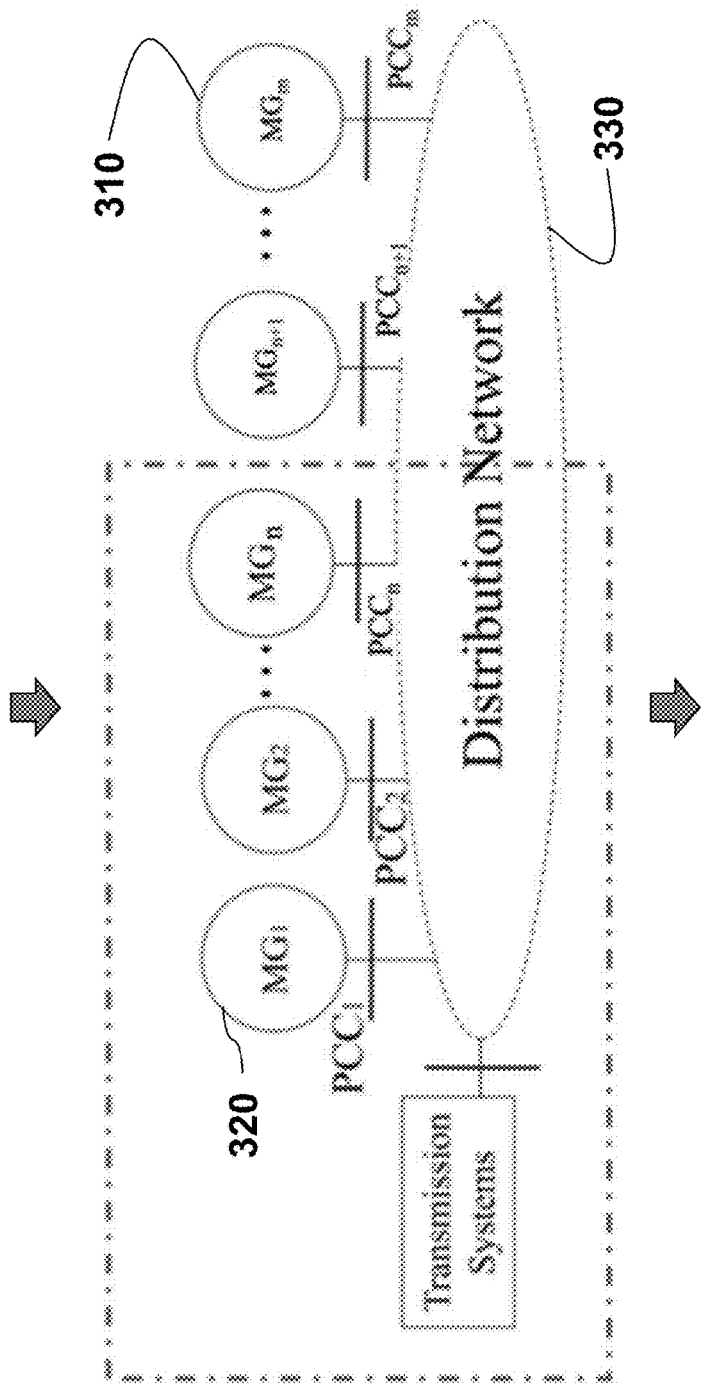
FIG. 3 is a schematic illustrating for a power distribution system with IV interconnected microgrids, according to embodiments of the present disclosure.

FIG. 3 shows a schematic of a power distribution system 330 with m interconnected microgrids, 310 and 320, according to embodiments of the present disclosure Assumed that droop controls are used at the points of common coupling (PCCs), the interface dynamics of i-th microgrid can be characterized by the following differential equations:

$$T_{ai}\dot{\delta}_i + \delta_i - \delta^*_i = D_{ai}(P^*_i - P_i) \quad (1aa)$$

$$T_{Vi}\dot{V}_i + V_i - V^*_i = D_{Vi}(Q^*_i - Q_i) \quad (1b)$$

where $V_i$, $\delta_i$, $P_i$ and $Q_i$ are the voltage magnitude, voltage phase angle, active and reactive power injection at the PCC of i-th microgrid, respectively, $V^*_i$, $\delta^*_i$, $P^*_i$ and $Q^*_i$ are the reference setting of $V_i$, $\delta_i$, $P_i$ and $Q_i$, respectively, which are determined by DSO according to steady state analysis, such as power flow studies, $T_{Vi}$ and $T_{ai}$ are the tracking time constants of voltage magnitude and phase angle, respectively, and $D_{Vi}$ and $D_{ai}$ are droop gains of voltage magnitude and phase angle.

Still referring to FIG. 3, the interface dynamics of m interconnected microgrids can be organized into the following compact form $$\dot{x}_m = A_m x_M + B_M u_M \quad (2)$$

where $x_m$ is the state vector, $x_m = [\delta_m^T, V_m^T]$, $\delta_m = [\delta_1, \ldots, \delta_m]^T$, $V_m = [V_1, \ldots, V_m]^T$; $u_m$ is the input vector:

$$u_m = [P_m^T, P^{*T}_m, \delta^{*T}_m, Q_m^T, Q^{*T}_m, V^{*T}_m]^T \quad (3)$$

in which, $P_m = [P_1, \ldots, P_m]^T$, $P^*_m = [P^*_1, \ldots, P^*_m]^T$, $\delta^*_m = [\delta^*_1, \ldots, \delta^*_m]^T$, $Q_m = [Q_1, \ldots, Q_m]^T$, $Q^*_m = [Q^*_1, \ldots, Q^*_m]^T$, $V^*_m = [V^*_1, \ldots, V^*_m]^T$; $A_m$ and $B_m$ are system matrix and input matrix:

$$A_m = \text{diag}\left(-\frac{1}{T_{a1}}, \ldots, -\frac{1}{T_{am}}, -\frac{1}{T_{V1}}, \ldots, -\frac{1}{T_{Vm}}\right), \quad (4a)$$

$$B_m = \begin{bmatrix} B_P & -B_{P^*} & -B_{a^*} & 0_{m \times m} & 0_{m \times m} & 0_{m \times m} \\ 0_{m \times m} & 0_{m \times m} & 0_{m \times m} & B_Q & -B_{Q^*} & -B_{V^*} \end{bmatrix}, \quad (4b)$$

in which $O_{m \times m}$ denotes a m by m zero matrix and submatrices $$B_P = \text{diag}\left(-\frac{D_{a1}}{T_{a1}}, \ldots, -\frac{D_{am}}{T_{am}}\right), \quad (5a)$$

$$B_{a^*} = \text{diag}\left(-\frac{1}{T_{a1}}, \ldots, -\frac{1}{T_{am}}\right), \quad (5b)$$

$$B_Q = \text{diag}\left(-\frac{D_{V1}}{T_{V1}}, \ldots, -\frac{D_{Vm}}{T_{Vm}}\right), \quad (5c)$$

$$B_{V^*} = \text{diag}\left(-\frac{1}{T_{V1}}, \ldots, -\frac{1}{T_{Vm}}\right), \quad (5d)$$

$$B_{P^*} = B_P, \; B_{Q^*} = B_Q. \quad (5e)$$

Still referring to FIG. 3, the interface dynamics of PCCs are coupled by the following power flow equations, i.e., network constrains:

$$P_i = V_i^2 G_{ii}^{sh} + \Sigma_k V_i V_k Y_{ik} \sin(\delta_i - \delta_k - \theta_{ik} + \pi/2), \quad (6a)$$

$$Q_i = -V_i^2 B_{ii}^{sh} + \Sigma_k V_i V_k Y_{ik} \sin(\delta_i - \delta_k - \theta_{ik}), \forall i \quad (6b)$$

where $G_{ii}^{sh}$ and $B_{ii}^{sh}$ are the shunt conductance and shunt susceptance of the i-th PCC, and $Y_{ik} \angle \theta_{ik}$ is the series admittance of the branch from the i-th PCC to the k-th PCC, and corresponding resistance and reactance components are:

$$R_{ik} = \frac{\cos(\theta_{ik})}{Y_{ik}}, \; X_{ik} = \frac{-\sin(\theta_{ik})}{Y_{ik}}.$$

The dynamics of m interconnected microgrids are described by (2) and (6). The setpoints $P^*_m$, $\delta^*_m$, $Q^*_m$ and $V^*_m$ are calculated based on steady-state studies under some economic or safety consideration, and they are dispatched to each microgrid by DSO. At a much finer time scale, $P_m$, $Q_m$, $\delta_m$ and $V_m$ evolve according to (2) and (6).

Still referring to FIG. 3, the connectivity of power distribution system can be proactively or passively changed due to the disaster events. Without loss of generality, we assume that a natural disaster has severe impact on the (n+1)-th to m-th microgrids 310, where integer n<m, such that the (m−n) microgrids 310 enter the islanding mode. The locations of the impacted microgrids are assumed to be reliably predicted by weather forecast, or other information networks. Before the (m−n) microgrids enter the islanding mode, the m interconnected microgrids are assumed to be at a quasi-steady state $o_m = [\delta^{*T}_m, V^{*T}_m]^T$. The truncated version of $o_m$, viz., $o_n = [\delta^{*T}_n, V^{*T}_n]^T$, serves as an initial condition of the remaining n interconnected microgrids 320 whose dynamic behavior can be described by differential equations $$\dot{x}_n = A_n x_n + B_n u'_n \quad (7)$$

associated with (6). In (7), $$u'_n = [P_n^T, P^{*'}_n{}^T, \delta^{*'}_n{}^T, Q_n^T, Q^{*'}_n{}^T, V^{*'}_n{}^T]^T \quad (8)$$

where $$P^{*'}_n = [P^{*'}_1, \ldots, P^{*'}_n]^T, \delta^{*'}_n = [\delta^{*'}_1, \ldots, \delta^{*'}_n]^T, \quad (9a)$$

$$Q^{*'}_n = [Q^{*'}_1, \ldots Q^{*'}_n], V^{*'}_n = [V^{*'}_1, \ldots, V^{*'}_n]^T \quad (9b)$$

which are selected by DSO in order to achieve certain economic/safety goals.

The dynamics of the remaining n interconnected microgrids (6) and (7) are shaped by control and network parameters. The control parameters can be written as $\alpha_c = [D_a^T, T_a^T, D_V^T, T_V^T]$, where $D_a = [D_{a1}, \ldots, D_{an}]T$, $T_a = [T_{a1}, \ldots, T_{an}]^T$, $D_V = [D_{V1}, \ldots, D_{Vn}]^T$ and $T_V = [T_{V1}, \ldots, T_{Vn}]T$. The network of the remaining n interconnected microgrids can be described by an undirect graph $G = (\mathcal{V}, \varepsilon)$, where nodal set $\mathcal{V}$ is the collection of all PCC in the n interconnected microgrids, and edge set $\varepsilon = \{(i, k)\}$ consists of all branches interconnecting the n microgrids. The compact form of network parameters is $\alpha_t = [R^T, X^T, \theta^T, G^{sh^T}, B^{sh^T}]^T$, where $R^T = [R_{ik}] \in \mathbb{R}^\varepsilon$, $X^T = [X_{ik}] \in \mathbb{R}^\varepsilon$ and $\theta^T = [\theta_{ik}] \in \mathbb{R}^\varepsilon$ for $(i, k) \in \varepsilon$, and $G^{sh^i} = [G_i^{sh}] \in \mathbb{R}$ $\mathcal{V}$ and $B^{sh^i} = [B_i^{sh}] \in \mathbb{R}$ $\mathcal{V}$ for $i \in \mathcal{V}$. Based on the above notations, the parameter vector $\alpha$ is defined as $\alpha = [\alpha_c^T \alpha_t^T]^T$. With the notation of parameter vector $\alpha$, the network constrains for the n interconnected microgrids can be rewritten as follows:

$$P_i(x_n | \alpha_t) = V_i^2 G_{ii}^{sh} + \sum_k V_i V_k Y_{ik} \sin(\delta_i - \delta_k - \theta_{ik} + \pi/2), \quad (10a)$$

$$Q_i(x_n | \alpha_t) = -V_i^2 B_{ii}^{sh} + \Sigma_k V_i V_k Y_{ik} \sin(\delta_i - \delta_k - \theta_{ik}), \forall i \quad (10b)$$

Note that (10) emphasizes that active and reactive power at each PCC is a function of state vector $x_n$, given network parameter $\alpha_t$.

Still referring to FIG. 3, DSO expects that, after the (m−n) microgrids are isolated, the remaining n microgrids, as shown as the red box in FIG. 3 can reach a pre-designed equilibrium point $o'_n = [\delta^{*'}_n, V^{*'}_n]$. However, the nonlinear system described by (7) and (10) with parameter vector $\alpha$ may not be configured in a manner that the pre-designed equilibrium $o'_n$ is asymptotically stable in the large. Therefore, the n interconnected microgrids might not be stable or they may end up with an undesirable operation condition where physical constrains of the grid are severely violated. Under such a condition, a key question is how to identify the most critical parameters in $\alpha$ and how to tune the selected parameters, such that the remaining n interconnected microgrids can stay asymptotically stable at the pre-designed equilibrium $o'_n$ after the (m−n) microgrids impacted by natural disasters enter the islanding mode.

Figure 4A:
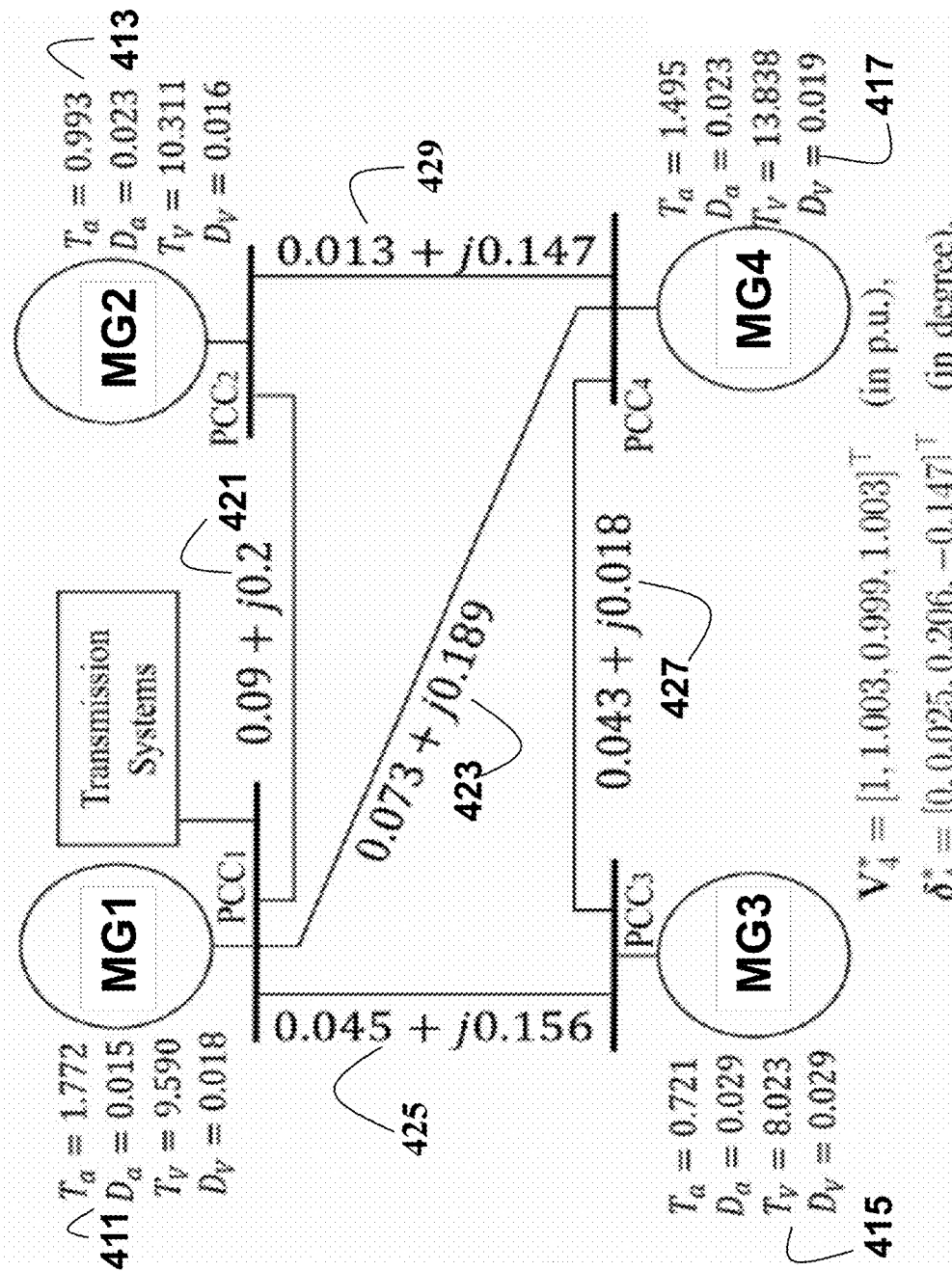
FIG. 4A is a schematic illustrating for a four-microgrid interconnection, according to embodiments of the present disclosure.

FIG. 4A is a schematic illustrating for a power distribution system with 4-interconnected microgrids, according to embodiments of the present disclosure. FIG. 4A also gives the network parameters $\alpha_t$, 421, 423, 425, 427 and 429, and control parameters $\alpha_c$, 411, 413, 415 and 417, and pre-disaster operation point $o_4 = [\delta^*_4{}^T, V^*_4{}^T]^T$ for the system.

FIG. 4B and FIG. 4C are schematics illustrating an evolution of voltage magnitude (FIG. 4B) and phase angle (FIG. 4C) after the microgrid 2 enters the islanding mode, according to embodiments of the present disclosure. The time instants t=0 410, t=T$_1$ 420 and t=T$_2$ 430 represent the moments for microgrid 2 entering islanding mode, expected time for entering pre-determined steady states, and expected time for converged at the pre-determined steady states.

Suppose that a disaster is predicted to be happened at microgrid 2 (FIG. 4A), forcing microgrid 2 to enter the islanding mode at t=0 410. According to economic/safety-based steady-state studies, the post-disaster equilibrium point is assigned at $O'_3 = [\delta^{*'}_3{}^T, V^{*'}_3{}^T]^T$, where $\delta^{*'}_3{}^T = [\delta^{*'}_1, \delta^{*'}_3, \delta^{*'}_4]^T = [0, 0.134, -0.285]^T$ (in degree), $V^{*'}_3{}^T = [V^{*'}_1, V^{*'}_3, V^{*'}_4]^T = [1, 0.999, 1.003]^T$ (in p.u.). However, the transient response study (FIG. 4B and FIG. 4C) during the period between t=T$_1$ 420 and t=T$_2$ 430 suggests that the predesigned equilibrium point cannot be achieved by using current parameter vectors $\alpha_t$ and $\alpha_c$.

A natural question is that how to systematically tune $\alpha_t$ and $\alpha_c$, such that the system can reach a desirable equilibrium point. This question will be addressed using a framework disclosed in the following sections.

Framework for Parameter Coordination of Interconnected Microgrids

The framework offers a set of procedures for the DSOs to assess stability at the pre-determined equilibrium points, prioritize system parameters based on the parameters' significance in terms of system dynamics, and systematically updating the selected critical parameters, such that pre-designed equilibrium points of the interconnected microgrid system can achieve asymptotically stable during a natural disaster event. The system parameter prioritization can be used for a DSO to choose which parameters to be reinforced to enable system achieving stable at desired equilibrium points with less investment costs, or which parameters to be adjusted to achieve stable at equilibrium points with less tuning efforts.

Considering that different systems may have different requirements for dynamics modeling, we provided three different stability assessment methods. The time domain simulation method is used when both the dynamics of phase angle and the dynamics of voltage magnitude are concerned. Meantime, LMI and SOS based methods are used when the dynamics of phase angles is most concerned. In addition, LMI and SOS also provide solutions with different conservative level and different computation effort requirements.

Stability Assessment Based on Time-Domain Simulation

The time domain simulations are used to capture the transient response and timing of control actions of power distribution system. To capture the transient response, a set of differential and algebraic equations are numerically solved. Power distribution systems typically include a large number of dynamic and static components, where each individual component may need several differential and algebraic equations to represent. The stability can be determined by checking the evolution of the dynamic process at a predetermined time window.

The continuous state-space representation (7) for dynamics of n interconnected microgrids can be discretized at $T_0$. The discrete version of (7) is given by $$x_n[k+1] = A_{dn}^{(\alpha_c)} x_n[k] + B_{dn}^{(\alpha_c)} c)u'_n[k] \quad (11)$$

where $A_{dn}^{(\alpha_c)}$ and $B_{dn}^{(\alpha_c)}$ are the discrete version of $A_n$ and $B_n$, respectively, in which the superscript $(\cdot)^{(\alpha_c)}$ highlights that $A_{dn}^{(\alpha_c)}$ and $B_{dn}^{(\alpha_c)}$ depend on the control parameter vector $\alpha_c$, and $x_n[k] \approx x_n(kT_0)$ and $u'_n[k] \approx u'_n(kT_0)$.

Without loss of generality, we assume the (m−n) microgrids enter the island-mode at time t=0. The time-domain evolution of state vector $x_n$ from time t=0 to $T_2$ can be captured by $E_{T_2} = [x_n[0], x_n[1], \ldots, x_n[K]]$, where $K = \lfloor T_2/T_0 \rfloor$ with $\lfloor \cdot \rfloor$ denoting the floor operation. Each column of $E_{T_2}$ is the "snapshot" of all states at a time instant. For an interconnected microgrid system with desirable dynamic performance, we require all states to stay closely to their steady states after sufficiently long time $T_1$. Matrix $E_{T_1}$, a submatrix of $E_{T_2}$, is used for the purpose of capturing the state dynamics after $T_1$, and it is defined as follows:

$$E_{T_1} = \left[x_n\left[\left\lfloor\frac{T_1}{T_0}\right\rfloor+1\right], \ldots, x_n[K]\right]. \quad (12)$$

Algorithm 1 gives a time-domain simulation based stability assessment procedure that is used for assessing the stability of the system. $\Omega$ is the user defined configuration used by stability assessment, and for Algorithm 1, $\Omega=(T_1, T_2, \kappa)$, $\kappa$ is a threshold vector for evaluating the closeness of states.

---

Algorithm 1
Time-domain Simulation based Stability Assessment Algorithm

1: function Stability Assess ($o_n$, $o'_n$, $\alpha$, $\Omega$)
2:     $\xi \leftarrow 0$, $x_n[0] \leftarrow o_n$,
3:     $P_i^{*'} \leftarrow P_i(o'_n|\alpha_t)$, $Q_i^{*'} \leftarrow Q_i(o'_n|\alpha_t)$, $\forall i = 1 \ldots n$,
4:     $P_i[0] \leftarrow P_i(o_n|\alpha_t)$, $Q_i[0] \leftarrow Q_i(o_n|\alpha_t)$, $\forall i = 1 \ldots n$
5:     Construct $u'_n[0]$ using $P_i[0]$, $Q_i[0]$, $o'_n$, $P_i^{*'}$, $Q_i^{*'}$, $\forall i = 1 \ldots n$ based on (8),
6:     while $k = 0, 1, 2, \ldots, (K-1)$ do
7:       $x_n[k+1] \leftarrow A_{dn}^{(\alpha_e)} x_n[k] + B_{dn}^{(\alpha_e)} u'_n[k]$
8:       $P_i[k+1] \leftarrow P_i(x_n[k+1]|\alpha_t)$,
        $Q_i[k+1] \leftarrow Q_i(x_n[k+1]|\alpha_t)$, $\forall i = 1 \ldots n$,
9:       Construct $u'_n[k+1]$ using $P_i[k+1]$, $Q_i[k+1]$, $o'_n$, $P_i^{*'}$, $Q_i^{*'}$, $\forall i = 1 \ldots n$ based on (8),
10:     end while
11:     Construct $E_{T_1}$ according to (12),
12:     $\Lambda = [\lambda_{pq}] \leftarrow \left(E_{T_1} - o'_n \mathbb{1}^T_{K-\lfloor\frac{T_1}{T_0}\rfloor}\right)$, where $\mathbb{1}_{K-\lfloor\frac{T_1}{T_0}\rfloor} \in \mathbb{R}^{K-\lfloor\frac{T_1}{T_0}\rfloor}$
is a vector with all entries being 1,
13:     Construct $\beta = [\beta_p] \in \mathbb{R}^n$, where $\beta_p \leftarrow \max_q |\lambda_{pq}|$,
      $\forall p = 1, 2, \ldots, n$,
14:     if $\beta \leq \kappa$ then
15:       $\xi \leftarrow 1$,
16:     end if
17:     return $\xi$.
18: end function

---

Given initial condition $o_n$, a pre-designed equilibrium $o'_n$, and parameter vector $\alpha$, Algorithm 1 outputs $\xi=1$, if an asymptotical stability can be achieved at the pre-designed equilibrium $o'_n$, otherwise it outputs 0.

The asymptotical stability at the pre-designed equilibrium can be regarded as achieved if all states stay close to the pre-designed equilibrium during the time interval from $T_1$ to $T_2$.

The closeness of $x_n(t)=[x_{ni}(t)] \in \mathbb{R}^{2n}$ and $o'_n=[o'_{ni}] \in \mathbb{R}^{2n}$ for $t \in [T_1, T_2]$ is defined by $\kappa=[\kappa_i] \in \mathbb{R}^{2n}$, $x_n(t)$ is said to be close to $o'_n$ from time $T_1$ to $T_2$, if, $$|x_{ni}(t) - o'_{ni}| \leq \kappa_i, \forall t \in [T_1, T_2], i = 1, 2, \ldots, 2n \quad (13)$$

Equation (13) is checked by line 14 to 16 in Algorithm 1, where $\beta \leq \kappa$ means $\beta \leq \kappa_i$ for all i. Where "$\leq$" denotes element-wised "less than or equal to".

Stability Assessment Based on Linear Matrix Inequality (LMI)

Considering that time-domain simulation is time consuming and pre-defined equilibrium point can be reached does not always means it is asymptotically stable, we provide methods that do not rely on time-domain simulation, but only system state space models.

One method is judging if the system is asymptotically stable based on linear matrix inequality (LMI) that used for linear systems. For nonlinearities introduced by system models such as power flow equations, we replace those non-linearity constrains with linear ones.

A linear matrix inequaility (LMI) is an expression of the form where, $x=[x_i, i=1, \ldots, m]$ is a real vector, $A_0$, $A_1$, $A_2$, $\ldots A_m$ are $n \times n$ symmetric matrices, and "" meaning the left-side matrix is a positive semidefinite matrix. This linear matrix inequality specifies a convex constraint on x.

Similar as discussed above, an n-microgrid interconnection can also be described by a direct graph $G=(\mathcal{V}, \varepsilon)$, where $\mathcal{V}=\{1, 2, \ldots, n\}$ is the collection of n buses, $\varepsilon=\{(i, k)\}$, whence ordered pair (i, k) denotes the edge from bus i to bus k. Note that $|\varepsilon|$ is the twice of the number of branches of the microgrid interconnection. Denote by $e_j=(i, k)$ the j-th element in $\varepsilon$.

We assume that there is a clear time-scale separation in the phase angle and voltage magnitude dynamics. The phase angle dynamics is much faster than the voltage magnitude dynamics such that voltage magnitudes can be approximated by their nominal values during the transient process. Therefore, we limit the scope of the disclosure to phase angle dynamics of interconnected microgrids. However, the voltage magnitude dynamics can be considered using similar approach.

The dynamics of the i-th microgrid described in (1) and (10) can be rewritten in the following incremental form:

$$T_{ai}\Delta\dot{\delta}_i + \Delta\delta_i = -D_{ai} \sum_{e_j \in \varepsilon_i} \kappa_{e_j} \phi_{e_j}(y_{e_j}), \quad (14a)$$

$$\phi_{e_j}(y_{e_j}) = \sin(y_{e_j} + y^*_{e_j}) - \sin(y^*_{e_j}) \forall e_j \in \varepsilon_i, \quad (14b)$$

where
$\varepsilon_i = \{(i, k) | k$ is the index of the direct neighbor of microgrid $i\} \subseteq \varepsilon$, $$\Delta\delta_i = \delta_i - \delta^*_i, \quad (15a)$$

$$y_{e_j} = \Delta\delta_i - \Delta\delta_k, \quad (15b)$$

$$y^*_{e_j} = \delta^*_i - \delta^*_k + \frac{\pi}{2} - \theta_{ik}, \quad (15c)$$

$$\kappa_{e_j} = V^*_i V^*_k Y_{ik}, \quad (15d)$$

for all $e_j=(i, k) \in \varepsilon_i$.
Define Matrices $X=[X_{p,q}] \in \mathbb{R}^{n \times |\varepsilon|}$ and $K=\text{diag}(\kappa_{e_1}, \kappa_{e_2}, \ldots, \kappa_{e_{|\varepsilon|}})$, where $$x_{p,q} = \begin{cases} 1 & \forall p = 1, 2, \ldots, n \wedge (p, q) \in \varepsilon_p \\ 0 & \text{otherwise} \end{cases} \quad (16)$$

The dynamics of the n-interconnected microgrids can be characterized by the following impact form $$\Delta\dot{\delta}_n = A_w \Delta\delta_n + B_n \phi(y_n), \quad (17a)$$

$$y_n = C_n \Delta\delta_n \quad (17b)$$

where $$\Delta\delta_n = [\Delta\delta_1, \Delta\delta_2, \ldots \Delta\delta_n]^T,$$

$$A_n = \text{diag}\left(-\frac{1}{T_{a1}}, -\frac{1}{T_{a2}}, \ldots -\frac{1}{T_{an}}\right), B = DXK,$$

whence $$D = \text{diag}\left(-\frac{D_{a1}}{T_{a1}}, -\frac{D_{a2}}{T_{a2}}, \ldots -\frac{D_{an}}{T_{an}}\right),$$

$$y_n = [y_{e_1}, y_{e_2}, \ldots y_{e_{|\varepsilon|}}]^T, C_n \in$$

$\mathbb{R}^{|\varepsilon| \times n}$ is the connectivity matrix, and $$\phi(y_n) = [\phi_{e_1}(y_{e_1}), \phi_{e_2}(y_{e_2}), \ldots, \phi_{e_{|\varepsilon|}}]^T. \quad (18f)$$

$\phi(y_n)$ is the power flow induced nonlinearities that are modeled using a generalized sector.

Figure 5A:
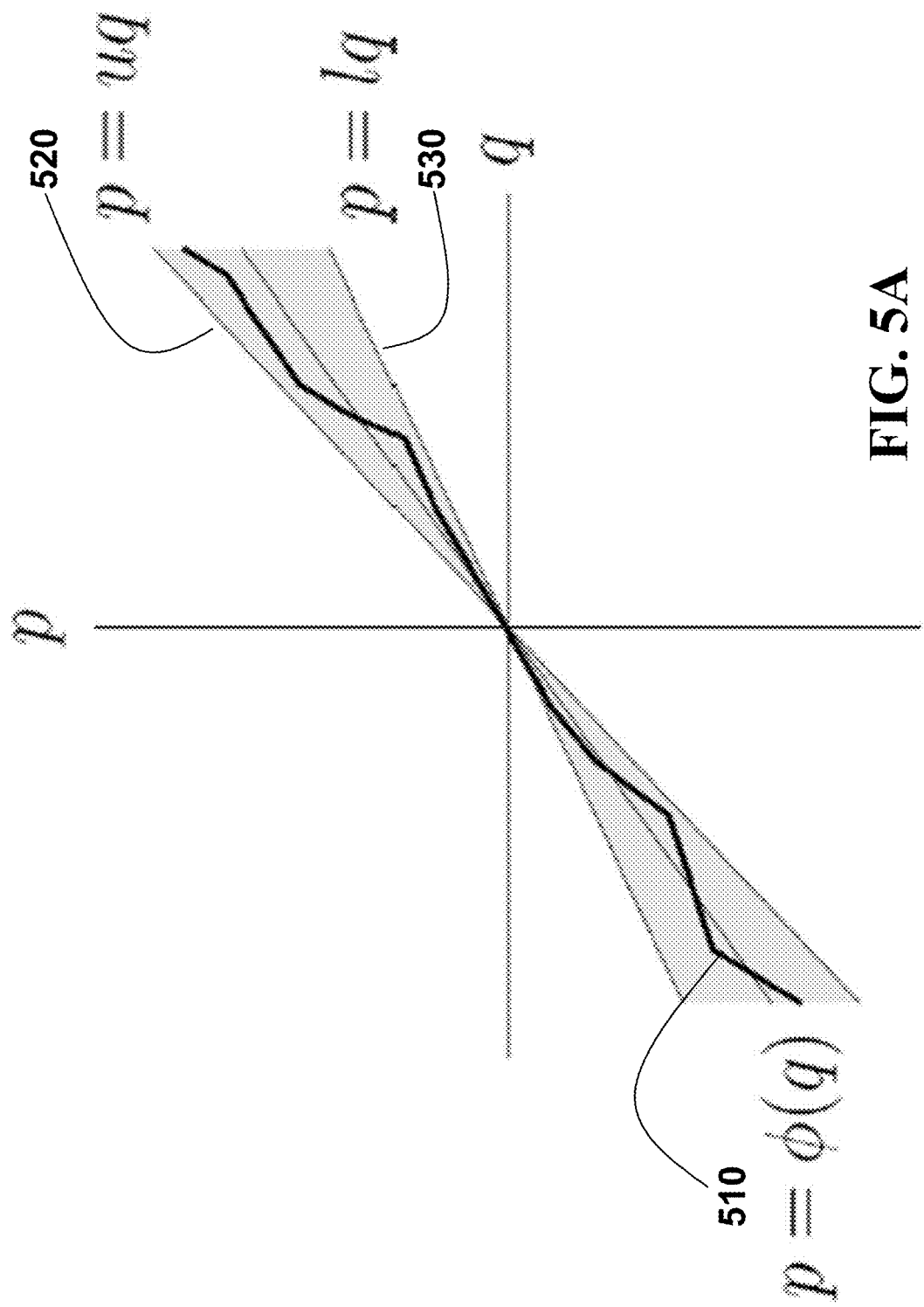
FIG. 5A is a graph illustrating using two linear bounds to bound a general function, according to embodiments of the present disclosure.

A function $\phi: \mathbb{R} \to \mathbb{R}$ is said to be in sector [l, u] if for all $q \in \mathbb{R}$, $p=\phi(q)$ 510 lies between lq 520 and uq 530, as shown in FIG. 5A.

Figure 5B:
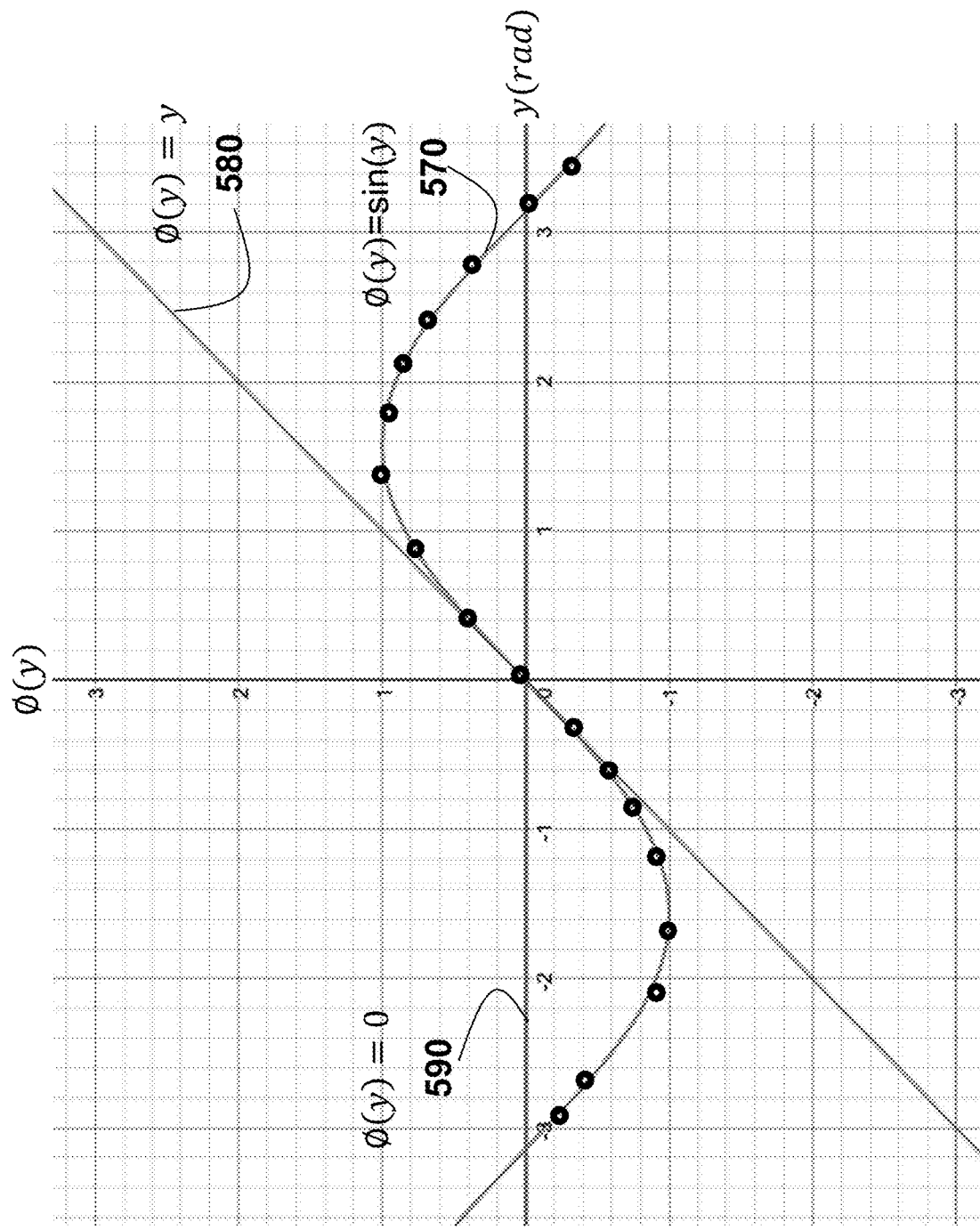
FIG. 5B is a graph illustrating using lines with slopes 0, and 1 to bound the sine curve that used by LMI based stability assessment method, according to embodiments of the present disclosure.

The function $\phi_{e_j}(y_{e_j})$ 570 defined in (15b) can be said to be in the sector [0,+1], 590 and 580 within its domain $[-\pi,+\pi]$ when $y^*_{e_j}=0$, as shown in FIG. 5B. If $y^*_{e_j} \neq 0$, we can still limit the domain within $[-\pi,+\pi]$ that are usually true for typical system operations.

The domain for $y_{e_j}$, $\alpha_{e_j}(\Delta\delta_n)$ is $[-\pi-y^*_{e_j}, \pi-y^*_{e_j}]$, or, equivalently, $$\alpha_{e_j}(\Delta\delta_n) = (y_{e_j}(\Delta\delta_n) + \pi + y_{e_j})(y_{e_j}(\Delta\delta_n) - y_{e_j}) \leq 0, \quad (19)$$

Within the domain $\alpha_{e_j}(\Delta\delta_n)$, the non-linearity $\phi_{e_j}(y_{e_j})$ for all $j = \{1, 2, \ldots |\varepsilon|\}$ can be contained within sector [0, 1], i.e., $$r_{e_j}(\Delta\delta_n, \phi_{e_j}) = \phi_{e_j}(y_{e_j})(\phi_{e_j}(y_{e_j}) - y_{e_j}) \leq 0. \quad (20)$$

Inequality (19) and (20) for $j \in \{1, 2, \ldots |\varepsilon|\}$ can be written in compact forms as $$r(\Delta\delta_n, \phi) = [r_{e_1}(\Delta\delta_n, \phi_{e_1}), r_{e_2}(\Delta\delta_n, \phi_{e_1}), \ldots, r_{e_{|\varepsilon|}}(\Delta\delta_n, \phi_{e_{|\varepsilon|}})]^T \leq 0 \quad (21)$$

and $$a(\Delta\delta_n) = [a_{e_1}(\Delta\delta_n), a_{e_2}(\Delta\delta_n), \ldots, a_{e_{|\varepsilon|}}(\Delta\delta_n),]^T \leq 0. \quad (22)$$

where, "≤" denotes element-wised "less than or equal to". In sum, the dynamics of interconnected microgrids are described by (17) with nonlinearity bounded by the generalized sector (21) in the domain (22).

The equilibrium point of the system described by (17) and (18) with sector bound (21) is asymptotically stable in domain (22), if there exists a positive-definite $P \in \mathbb{R}^{n \times n}$, positive-semi-definite and diagonal matrices $\Lambda, T \in \mathbb{R}^{|\varepsilon| \times |\varepsilon|}$, such that $$\begin{bmatrix} A_n^T P + P A_n & P B_n + A_n^T C_n^T \Lambda + C_n^T T \\ B_n^T P + \Lambda C_n A_n + T C_n & \Lambda C_n B_n + B_n^T C_n^T \Lambda - 2T \end{bmatrix} < 0. \quad (23)$$

This stability condition is actually the LMI version of the Kalman-Yakubovich-Popov condition corresponding to the multi-variable Popov condition. If the condition is satisfied within the sector bound [0,1], we can say the system is stable. Outside of the sector bound, we can say nothing about the stability, i.e. are not sure if the system is stable or not. Therefore, (23) is a sufficient condition for stability assessment.

The feasibility of (23) can be easily checked by existing tools, such as the Robust Control Toolbox (RCT) in MATLAB.

Algorithm 2 gives a procedure for using criteria (23) to determine the asymptotic stability in the large of the pre-designed equilibrium. For Algorithm 2, $\Omega = \emptyset$. The output of Algorithm 2 is a flag variable $\xi$. $\xi = 1$ suggests the pre-designed equilibrium is asymptotically stable in the large, whereas $\xi = 0$ indicates that no conclusion on the asymptotic stability can be reached.

---

Algorithm 2 LMI based Stability Assessment Algorithm

1: function Stability Assess($o_n$, $o_n'$, $\alpha$, $\Omega$)
2:    Calculate $A_n$, $B_n$, $C_n$, in (17), and $a(\Delta\delta_n)$
3:    Impose LMI constrains in P, $\Lambda$, T, and (23) in RCT
4:    Check the feasibility of the LMIs.
5:    if the LMIs are feasible then
6:      $\xi = 1$,
7:    Else
8:      $\xi = 0$,
9:    end if
10:   return $\xi$
11: end function

---

Stability Assessment Based on Sum of Square (SOS) Programming

In the above section, LMI based direct stability assessment approach is used to check system stability. However, since the sine based nonlinear constraints are replaced with linear ones, the assessment results might be over-conservative. In other words, some cases that the approach could not determine as stable might be stable at reality. Considered this, based on sum of square (SOS) programming, we use higher order polynomials to replace the sine based nonlinear constraints, thus the resulting solutions are less conservative that the LMI based ones.

The SOS based stability assessment method is used to determine if the system is asymptotically stable by checking the feasibility of a sufficient condition for stability derived using polynomial Lyapunov functions in terms of sum of squares.

For vectors $x_1$ and $x_2$, $\psi(x_1, x_2) \in \mathbb{R}^q[x_1, x_2]$ is a q-dimensional vector of polynomials in $x_1$ and $x_2$. $\psi(x_1, x_2)$ is SOS if each polynomial $\psi_i(x_1, x_2)$ in polynomial vector $\psi$ can be expressed as SOS polynomials in $x_1$ and $x_2$, i.e., $$\psi_i(x_1, x_2) = \Sigma_{k=1}^{w_i} h_k(x_1, x_2)^2, \forall i = 1, 2, \ldots, q,$$

where $h_k(x_1, x_2)$ is a polynomial in $(x_1, x_2)$.

Figure 6:
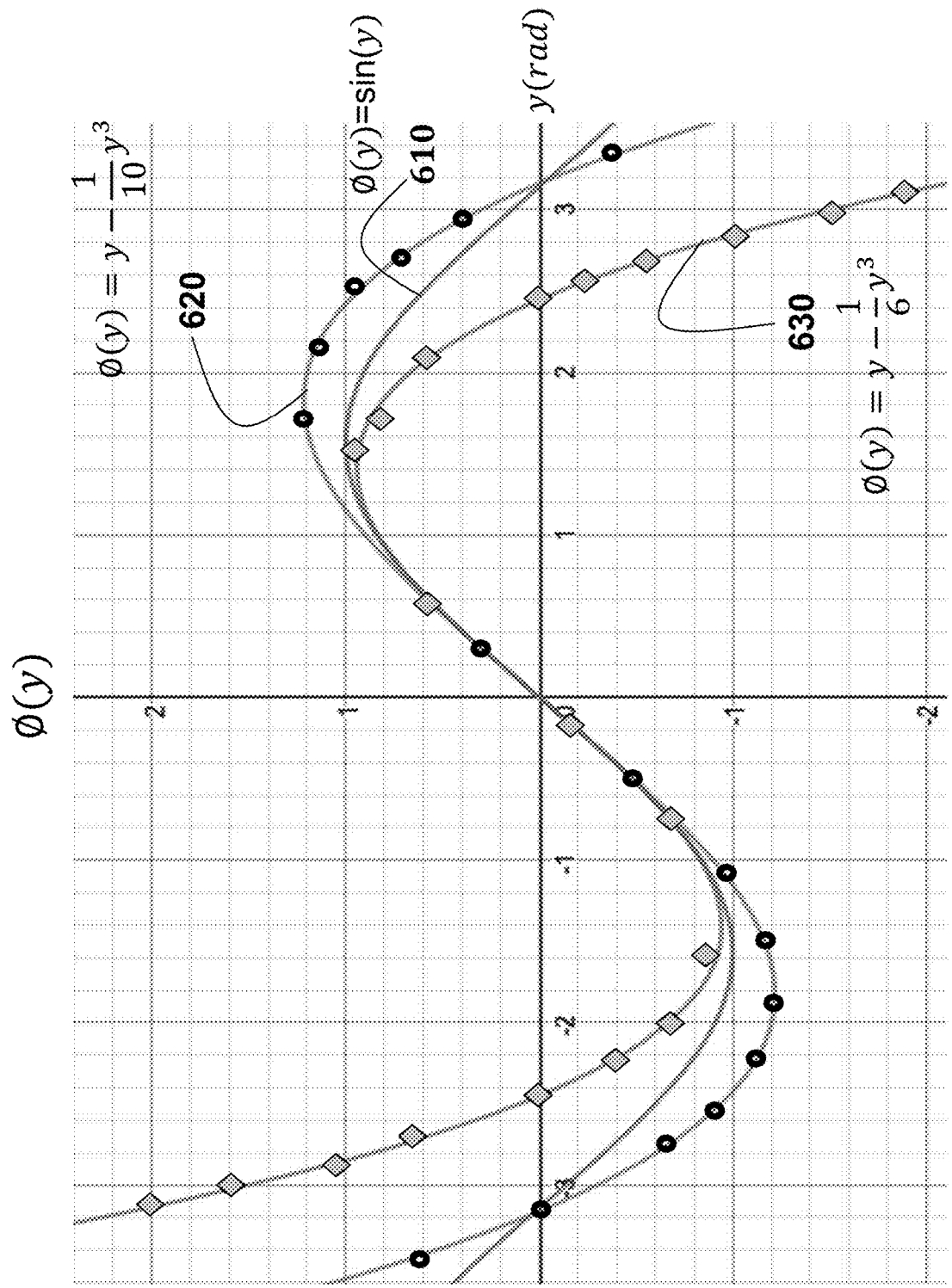
FIG. 6 is a graph illustrating using two polynomial curves to bound sine curve that used by SOS based stability assessment method, according to embodiments of the present disclosure.

FIG. 6 is a graph illustrating using two polynomial curves, 620 and 630 to bound sine curve, 610 that used by SOS based stability assessment approach, according to embodiments of the present disclosure.

We use two high-order polynomials to bound the power flow induced nonlinearities $\phi_{e_j}(y_{e_j})$ as defined in (15b). For $-\pi \leq y \leq \pi$, $\sin(y)$ is in sector $$\left[y - \frac{y^3}{6}, y - \frac{y^3}{10}\right].$$

By replacing y with $(y_{e_j} + y^*_{e_j})$, we have $$r_{e_j}(\Delta\delta_n, \phi_{e_j}) = (\phi_{e_j}(y_{e_j}) - \eta_1(y_{e_j}))(\phi_{e_j}(y_{e_j}) - \eta_2(y_{e_j})), \quad (24a)$$

$$\eta_1(y_{e_j}) = (y_{e_j} + y^*_{e_j}) - \frac{1}{6}(y_{e_j} + y^*_{e_j})^3 - \sin(y^*_{e_j}), \quad (24b)$$

$$\eta_2(y_{e_j}) = (y_{e_j} + y^*_{e_j}) - \frac{1}{10}(y_{e_j} + y^*_{e_j})^3 - \sin(y^*_{e_j}), \quad (24c)$$

Still using inequality (19) to represent the domain for $y_{e_j}$, inequality (24) and (19) for $j \in \{1, 2, \ldots |\varepsilon|\}$ can be written in compact forms as $$r(\Delta\delta_n, \phi) = [r_{e_1}(\Delta\delta_n, \phi_{e_1}), r_{e_2}(\Delta\delta_n, \phi_{e_1}), \ldots r_{e_{|\varepsilon|}}(\Delta\delta_n, \phi_{e_{|\varepsilon|}})]^T \leq 0 \quad (25)$$

and $$\alpha(\Delta\delta_n) = [\alpha_{e_1}(\Delta\delta_n), \alpha_{e_2}(\Delta\delta_n), \ldots, \alpha_{e_{|\varepsilon|}}(\Delta\delta_n),]^T \leq 0. \quad (26)$$

The equilibrium point of the system described by (17) and (18) with sector bound (25) is asymptotically stable in domain $\{\Delta\delta_n | \alpha(\Delta\delta_n) \leq 0\}$, if there exists a polynomial $V(\Delta\delta_n)$ with $V(0)=0$, SOS polynomials $s_1(\Delta\delta_n, \phi)$ and $s_2(\Delta\delta_n, \phi)$, and strictly positive definite polynomials $\sigma_1(\Delta\delta_n)$ and $\sigma_2(\Delta\delta_n)$, such that $$V(\Delta\delta_n) - \sigma_1(\Delta\delta_n) \text{ is } SOS \text{ in } \Delta\delta_n, \quad (27)$$

$$-\nabla V(A_n\Delta\delta_n + B_n\phi) - \sigma_2 + s_1^T r + s_2^T \alpha \text{ is } SOS \text{ in } \Delta\delta_n \text{ and } \phi. \quad (28)$$

The feasibility of above two conditions can be easily checked by imposing inequality constrains in existing SOS programming tools, such as SOSTOOLS written for MAT-LAB. For equations (27) and (28), the degree of polynomial/polynomial vectors V, $s_1$, $s_2$, $\sigma_1$ and $\sigma_2$ are user-defined parameters, which can be represented by $1_V$, $1_{s_1}$, $1_{s_2}$, $1_{\sigma_1}$ and $1_{\sigma_2}$ respectively.

Algorithm 3 gives a procedure for using criteria (27) and (28) to determine the asymptotic stability of the pre-designed equilibrium. $\Omega = (1_V, 1_{s_1}, 1_{s_2}, 1_{\sigma_1}, 1_{\sigma_2})$. The output of Algorithm 3 is a flag variable $\xi$. $\xi=1$ suggests the pre-designed equilibrium is asymptotically stable, whereas $\xi=0$ indicates that no conclusion on the asymptotic stability can be reached.

| Algorithm 3 SOS based Stability Assessment Algorithm |
| --- |
| 1: function Stability Assess($o_n$, $o_n'$, $\alpha$, $\Omega$) |
| 2:     Construct $A_n$, $B_n$, $C_n$, in (17) based on $o_n$, $o_n'$, $\alpha$ |
| 3:     Construct $r(\Delta\delta_n, \phi)$ based on (24) and (25), |
| 4:     Construct $a(\Delta\delta_n)$ based on (19) and (26), |
| 5:     Check the feasibility of (27) and (28) in SOSTOOLS, |
| 6:     if (27) and (28) are feasible then |
| 7:        $\xi = 1$, |
| 8:     Else |
| 9:        $\xi = 0$, |
| 10:    end if |
| 11:    return: $\xi$ |
| 12: end function |

Systematic Parameter Modification of Interconnected Microgrids

The systematic parameter modification of interconnected microgrids is accomplished by using Monte-Carlo simulation and stability assessment.

Monte-Carlo simulation is employed to represent the distributions of parameter combinations using limited number of random samples. Each sample is determined by selecting a value for each parameter within its tunable ranges randomly according to its probability distribution function.

Denote by $\alpha_i$ the i-th entry in vector $\alpha$. Set $\mathcal{J}$ collects the indices of all adjustable parameters. Each adjustable parameter $\alpha_i$ for $i \in \mathcal{J}$ has an upper bound and a lower bound, represented by $\gamma'_i$ and $\gamma''_i$, respectively. Denote by $\alpha' = [\alpha'_i]$ the randomized version of a, where $$\alpha'_i = \begin{cases} \gamma_i \alpha_i & i \in \mathcal{J} \\ \alpha_i & \text{otherwise} \end{cases} \quad (29)$$

whence $\gamma_i$ is a realization of random variable $\Gamma_i$ which has a uniform distribution, i.e., $\Gamma_i \sim \mathcal{U}(\gamma'_i, \gamma'_i)$. With the above notations, the procedure for parameter modification is described in Algorithm 4, where N is the total number of parameter samples created by using Monte-Carlo simulation, and defined by users, $\|\cdot\|_2$ is the $\mathcal{L}-2$ norm, and $\Gamma' = \{\gamma'_i | i \in \mathcal{J}\}$, $\Gamma'' = \{\gamma'_i | i \in \mathcal{J}\}$.

| Algorithm 4 Systematic Parameter Modification Algorithm |
| --- |
| 1: function ParaMod(N, $o_n$, $\alpha$, $\mathcal{J}$, $\Omega$, $\Gamma'$, $\Gamma''$) |
| 2:     $\mathcal{S} \leftarrow \emptyset$, $o_n^* \leftarrow 0$, |
| 3:     while $k = 1, 2, \ldots, N$ do |
| 4:        Construct $\alpha'$ via (29), |
| 5:        Update $o_n'$ via power flow studies based on $\alpha'$, |
| 6:        $\xi \leftarrow$ StabilityAssess ($o_n$, $o_n'$, $\alpha'$, $\Omega$), |
| 7:        if $\xi = 1$ then |
| 8:           $\mathcal{S} \leftarrow \mathcal{S} \cup \alpha'$, |
| 9:        end if |
| 10:    end while |
| 11:    if $\mathcal{S} = \emptyset$ then |
| 12:        $v^* = 0$, |
| 13:    Else |
| 14:        $v^* \leftarrow \arg\min_{v \in \mathcal{S}} \|\alpha - v\|_2$, |
| 15:        Update $o_n'$ via power flow studies based on $v^*$, |
| 16:        $o_n^* \leftarrow o_n'$, |
| 17:    end if |
| 18:    return $v^*$, $o_n^*$. |
| 19: end function |

Given adjustable parameters ($\alpha$, $\mathcal{J}$) associated with their tunable ranges ($\Gamma'$, $\Gamma''$), Algorithm 4 first searches for parameter combinations $\mathcal{S}$ that enable asymptotical stability at the pre-designed equilibrium $o_n'$ (Line 3 to 9 in Algorithm 4). It is worth noting that, as $\mathcal{J}$ may include network parameter indices, the post-disaster equilibrium point $o_n'$ should be revised accordingly. Then, Algorithm 4 returns one parameters combination $v^*$ that minimizes the Euclidean distance from the initial parameters $\alpha$ among all eligible combinations $\mathcal{S}$, as well as the corresponding equilibrium point $o^*_n$.

Figure 7A:
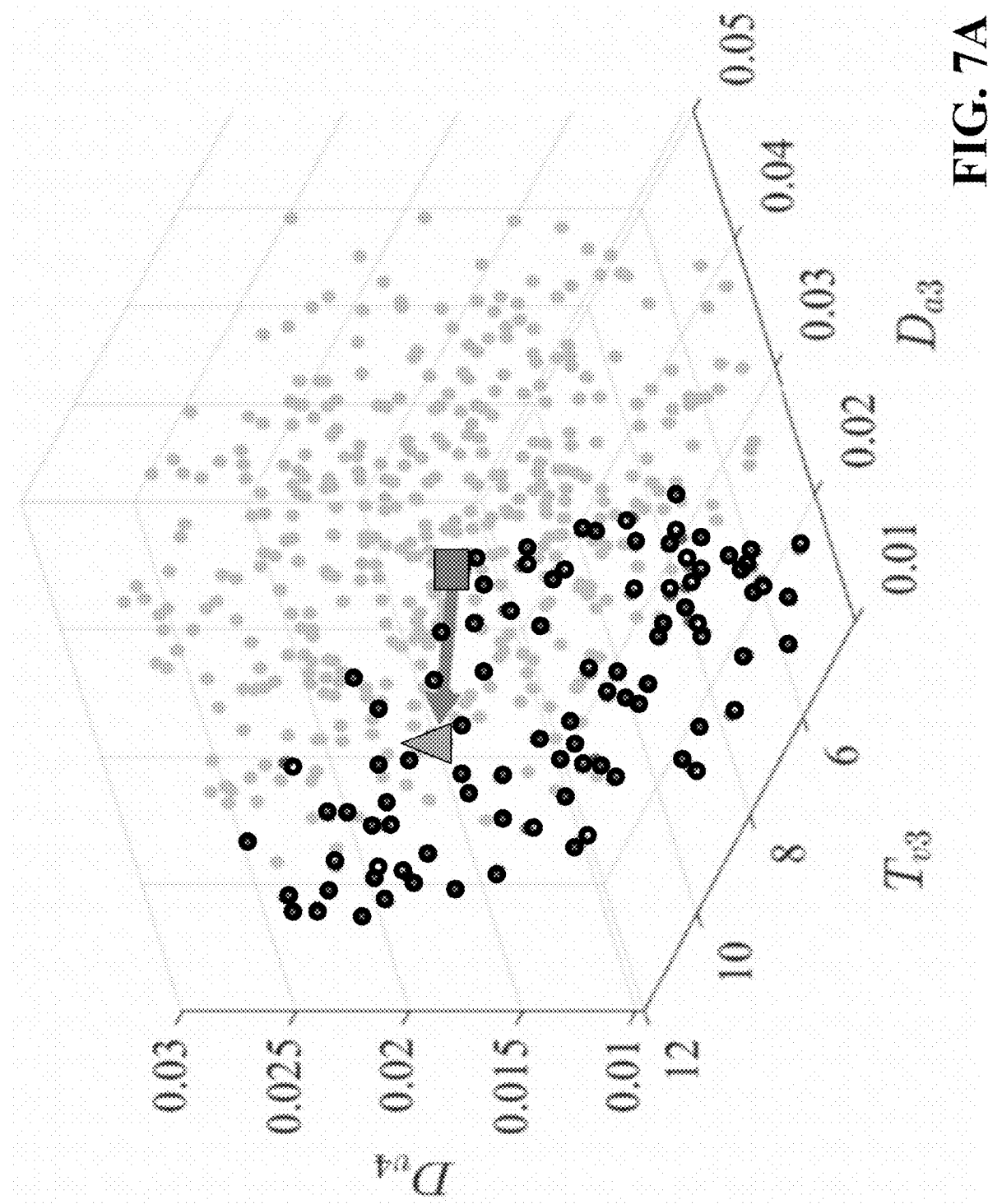
FIG. 7A is a graph illustrating a plot for visualization of desirable, undesirable, initial and suggested parameters, according to embodiments of the present disclosure.

For the example system shown in FIG. 4A, we can determine a systematic scheme for parameter tuning of the system using Algorithm 4 and one of Algorithm 1-3. Here Algorithm 1 is used. FIG. 7A is a graph illustrating a plot for visualization of desirable, undesirable, initial and suggested parameters, according to embodiments of the present disclosure.

Figure 7B:
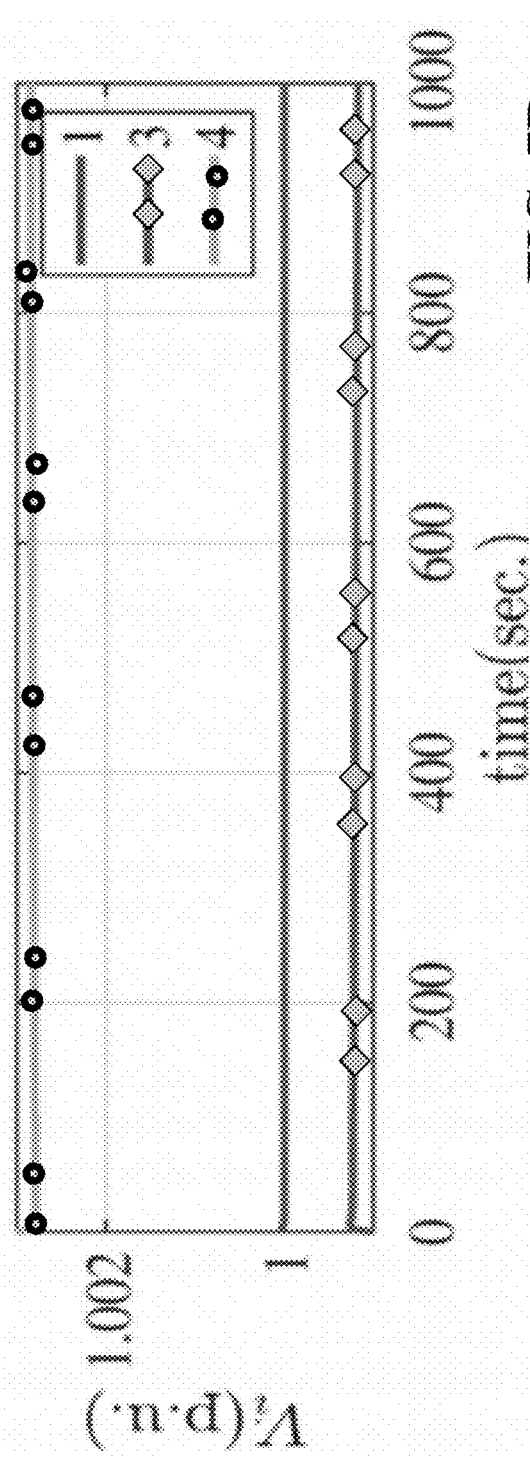
FIG. 7B and FIG. 7C are schematics illustrating an evolution of voltage magnitude (FIG. 7B) and phase angle (FIG. 7C) after the microgrid 2 enters the islanding mode using the suggested parameters, according to embodiments of the present disclosure.
Figure 7C:
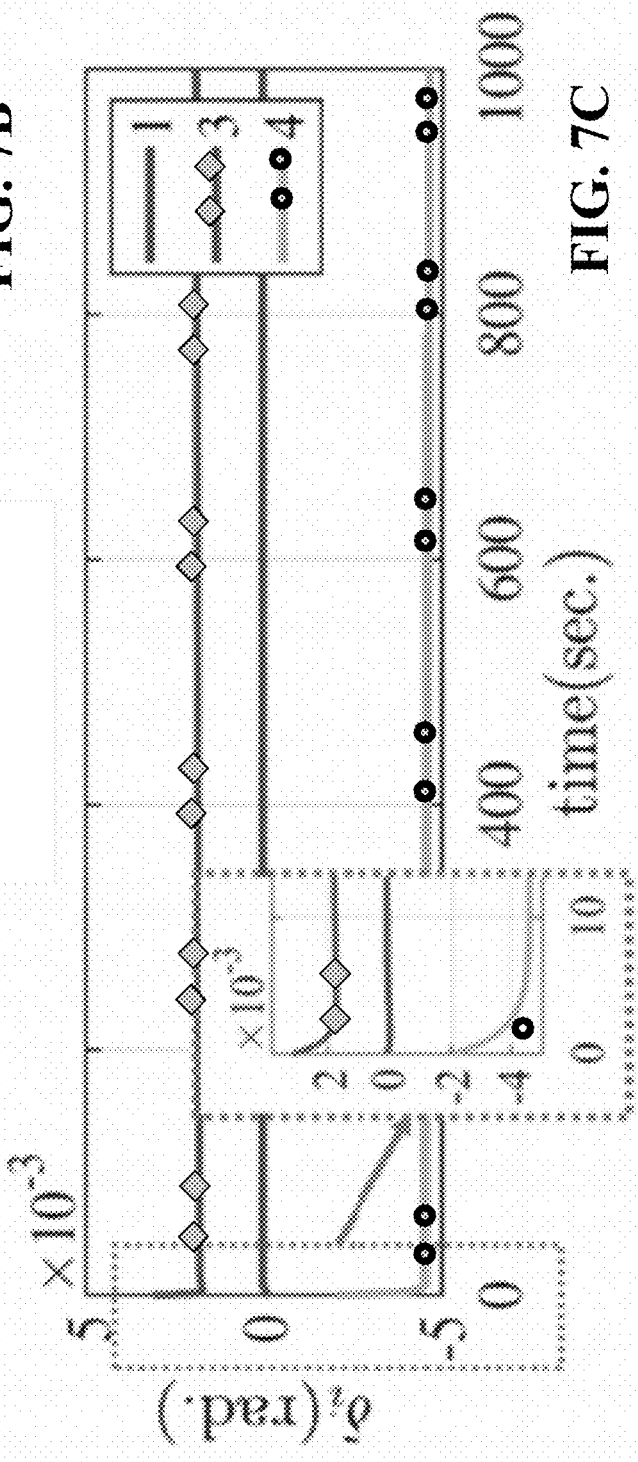

FIG. 7B and FIG. 7C are schematics illustrating an evolution of voltage magnitude (FIG. 7B) and phase angle (FIG. 7C) after the microgrid 2 enters the islanding mode using the suggested parameters, according to embodiments of the present disclosure.

Assume that the adjustable parameters are $D_{a3}$, $T_{V3}$, and $D_{V4}$ in the exemplar system. Algorithm 4 can be employed to systematically modify these tunable parameters. The results are given in FIG. 7A, FIG. 7B and FIG. 7C. FIG. 7A is a plot for visualization of desirable (circles), undesirable (orange dots), initial (box) and suggested (triangle) parameters. FIG. 7B and FIG. 7C shows the evolution of voltage magnitude (FIG. 7B) and phase angle (FIG. 7C) after the microgrid 2 enters the islanding mode using the suggested parameters. In Algorithm 4, N=500, $T_1$=500 and $T_2$=1000. The adjustable parameters are allowed to vary from 50% to 150% of their original values, i.e., $\gamma'_i$=0.5 and $\gamma''_i$=1.5 in (29). The threshold vector $\kappa$=[$\kappa_i$] is set according to the following criteria: if a state variable $x_{ni}$ is a voltage magnitude, then $\kappa_i$=0.5, and if a state variable $x_{ni}$ corresponds to a phase angle, then $\kappa_i$=0.01. Algorithm 4 first searches parameters S leading to desirable dynamic performance, which are visualized in FIG. 7A. Then, the parameter combination closest to the initial parameter combination is considered as a suggestion for parameter update as listed in Table I. As shown in FIG. 7B and FIG. 7C, with the parameters suggested by Algorithm 4, desirable dynamic performance can be accomplished.

TABLE I

Parameter Modification for $D_{a3}$, $T_{V3}$, and $D_{V4}$

| Name | $D_{a3}$ | $T_{V3}$ | $D_{V4}$ |
|---|---|---|---|
| Initial Value | 0.0293 | 8.0234 | 0.0192 |
| Suggested Value | 0.0195 | 8.9939 | 0.0206 |
| Change Rate | 33.35% | 12.10% | 7.37% |

Parameter Prioritization of Interconnected Microgrids

It is noted that there are two practical needs for DSO what render Algorithm 4 insufficient: 1) DSO may have limited number of adjustable parameters, then it is likely that Algorithm 4 may fail to find a desirable parameter combination, i.e., $v^*$=0, 2) although having a large amount of adjustable parameters, a DSO expects to only tune a small subset of adjustable parameters such that the post-disaster interconnected microgrids can still maintain asymptotically stable at the pre-designed equilibrium point. In both cases, it is necessary to have a parameter prioritization algorithm which can identify parameters that are critical to system stability. In the former case, the prioritization algorithm offers a solution on how to decide which control/network parameters should be engineered to be adjustable. In the latter case, the prioritization algorithm suggests how to modify system with small efforts such that a desirable dynamic performance can be achieved.

Algorithm 5 gives a procedure for prioritizing parameters of interconnected microgrids. Wherein $\mathcal{J}$ is the set of all candidate parameters for case 1), or all tunable parameters for case 2). H is the user-defined parameter denoting the number of critical parameters, H<<|$\mathcal{J}$|. $\mathcal{J}$ is the set of critical parameters, and Ø is the Hadamard division operation. The candidate parameters are ranked (Lines 5-7) based on the relative distance between initial parameters before the disaster event and updated parameters determined for the post-disaster equilibrium points.

Algorithm 5 Parameter Prioritization Algorithm

```
1: function Prior (N, o_n, α, J, Ω, H, Γ', Γ")
2:   J ← ∅,
3:   v* ← ParaMod(N, o_n, α, J, Ω, Γ', Γ")
4:   if v* ≠ 0 then
5:     w = [w_i] ← (α - v*) ⊘ α,
6:     while k = 1, 2, . . . , H do
7:       i* = arg_i max|w_i|, w_{i*} ← 0, J ← J ∪ i*,
8:     end while
9:   end if
10:  return J.
11: end function
```

After the results of parameter prioritization are obtained, the selected parameters in $\mathcal{J}$ can be further tuned using Algorithm 6. Algorithm 6 includes both parameter prioritization, and parameter modification.

Algorithm 6 Parameter Prioritization and Modification Algorithm

```
1: Inputs: N, M, o_n, α, Ω, H, J, Γ', Γ"
2: J ← Prior (N, o_n, α, J, Ω, H, Γ', Γ"),
3: v* ← 0,
4: if J ≠ ∅ then
5:   v*, o_n* ← ParaMod(M, o_n, α, J, Ω, Γ', Γ"),
6: end if
7: return v*, o_n*.
```

Still referring to the example system shown in FIG. 4A, supposed that all 26 parameters (ignored shunt admittances and phase shifts) in the system shown in FIG. 4A are adjustable. In Algorithm 6, N=99, M=500, and H=3. Besides, set 3 in Algorithm 6 includes all adjustable parameters, viz., |$\mathcal{J}$|=26. Line 2 in Algorithm 6 returns the top three critical parameters which are $R_5$, $T_{a2}$, and $D_{V4}$. The suggested parameters are listed in Table II.

Figure 8A:
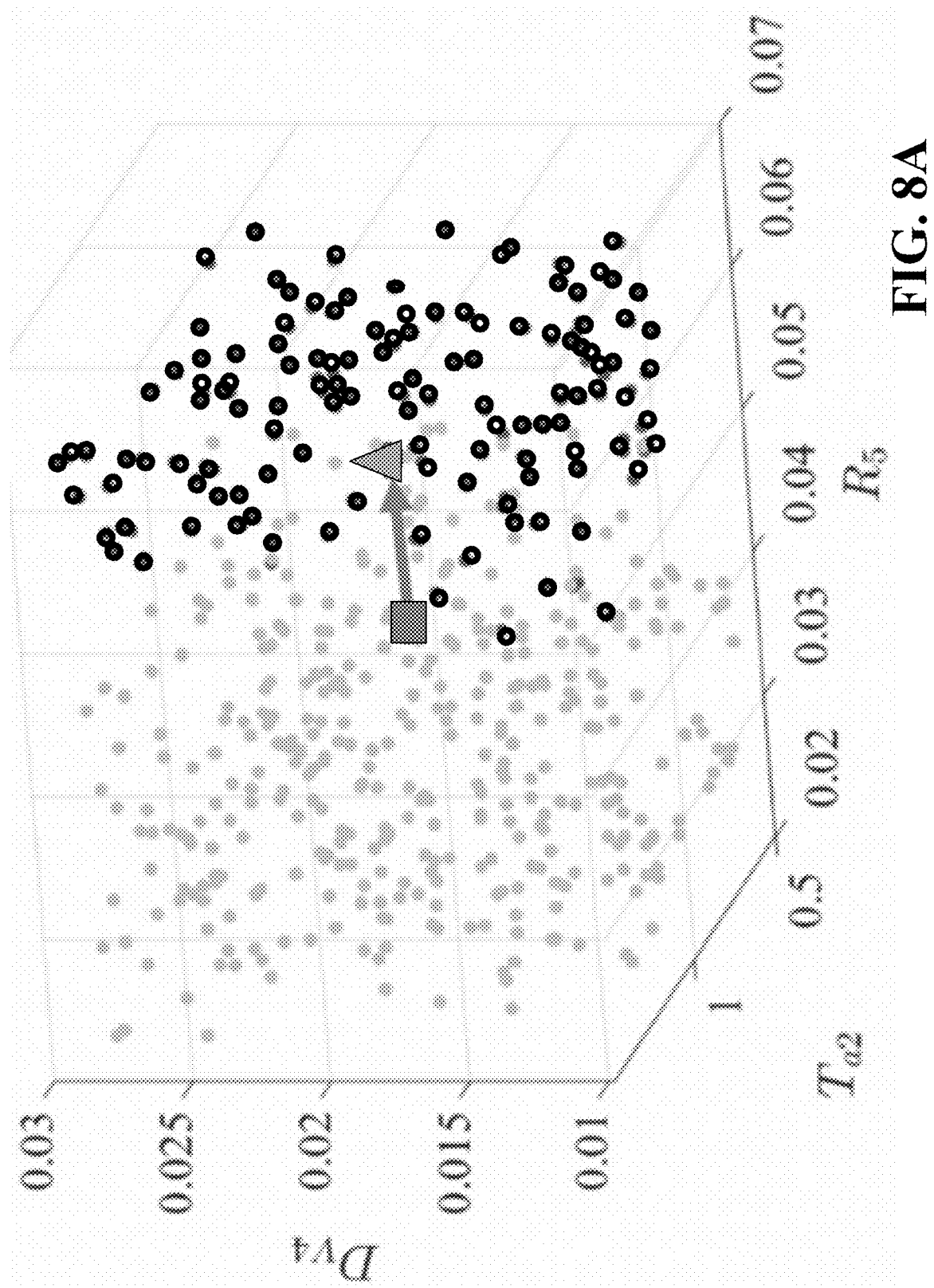
FIG. 8A is a graph illustrating a plot for visualization of desirable, undesirable, initial and suggested parameters, according to embodiments of the present disclosure.

FIG. 8A is a graph illustrating a plot for visualization of desirable, undesirable, initial and suggested parameters, according to embodiments of the present disclosure. Wherein a plot for visualization of desirable (circles), undesirable (dots), initial (box) and suggested (triangle) parameters.

Figure 8B:
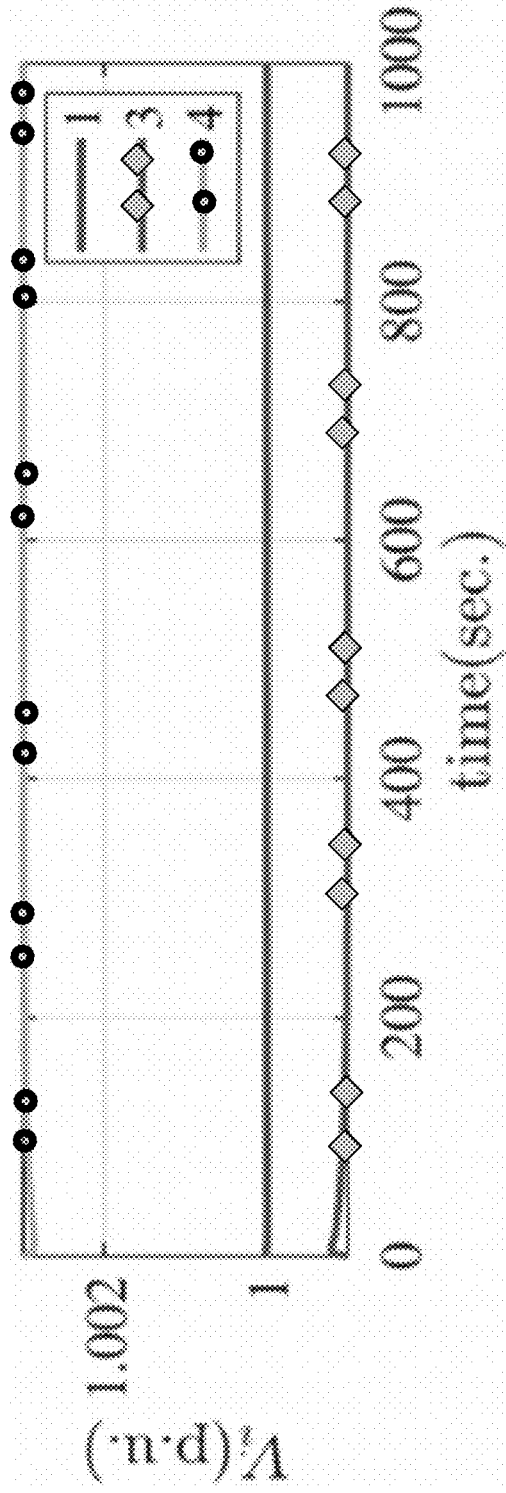
FIG. 8B and FIG. 8C are schematics illustrating an evolution of voltage magnitude (FIG. 8B) and phase angle (FIG. 8C) after the microgrid 2 enters the islanding mode using the suggested parameters, according to embodiments of the present disclosure.
Figure 8C:
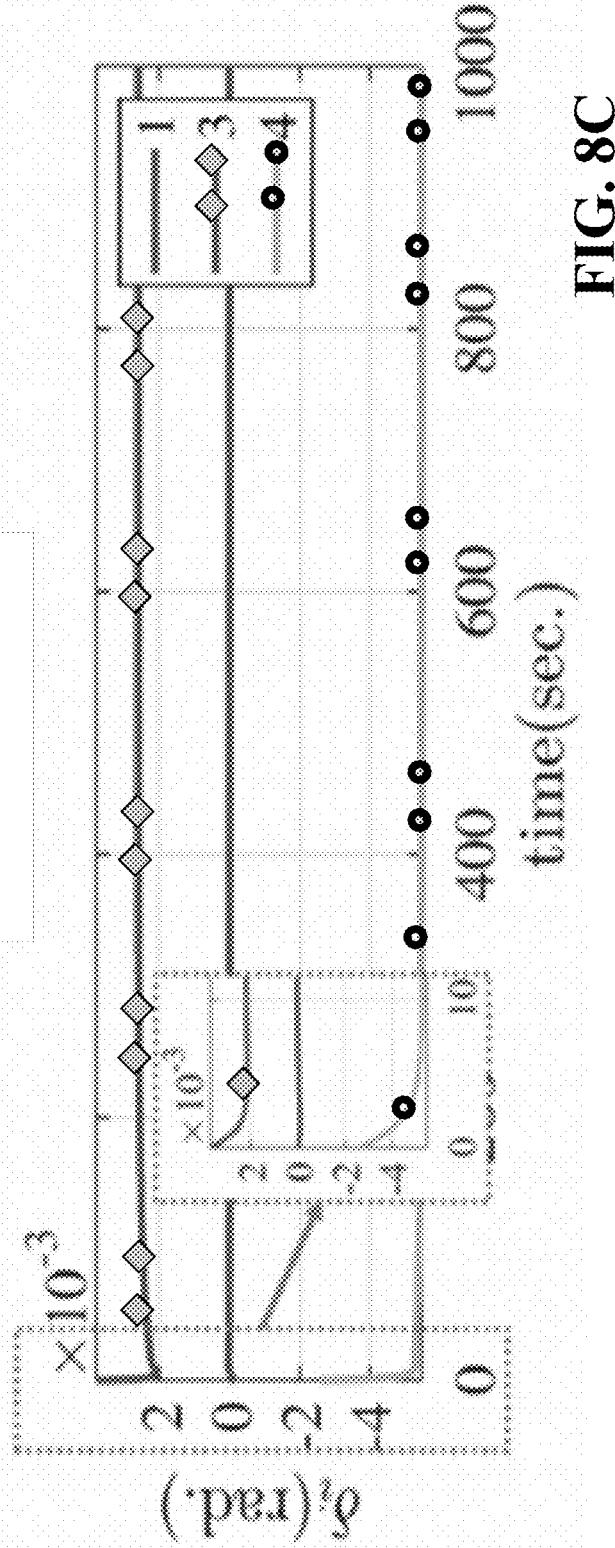

FIG. 8B and FIG. 8C are schematics illustrating an evolution of voltage magnitude (FIG. 8B) and phase angle (FIG. 8C) after the microgrid 2 enters the islanding mode using the suggested parameters, according to embodiments of the present disclosure.

TABLE II

Parameter Modification for the Selected Parameters

| Name | $R_5$ | $T_{a2}$ | $D_{V4}$ |
|---|---|---|---|
| Initial Value | 0.0432 | 0.9929 | 0.0192 |
| Suggested Value | 0.0553 | 1.0013 | 0.0194 |
| Change Rate | 28.02% | 0.85% | 1.08% |

Features

A system for coordinating parameters including network parameters and control parameters of a power distribution system (PDS), the PDS includes interconnected microgrids. Each microgrid is connected through a point of common coupling (PCC), and each microgrid is connected with adjacent microgrids through tie lines. The system including a computing hardware system including computing devices communicatively linked to the PDS via an information network. Wherein at least one computing device of the computing devices is configured to receive a predicted-future event and a subset of microgrids entering island-mode due to the predicted-future event, along with current tunable parameters and their associated tunable ranges in the PDS via the information network. Generate samples of network and control parameter combinations for the PDS that initiate asymptotical stability of the PDS, based on a comparison of the current tunable parameters and their associated tunable ranges and a simulation model with a predefined deviation threshold, to obtain tunable parameters. Prioritize each parameter in the tunable parameters according to a level of importance to the asymptotical stability of the PDS, and select a subset of tunable parameters to be tuned, based on a comparison of the prioritized tunable parameters and a system stability model with a predetermined importance threshold. Determine a tuning scheme for the subset of tunable parameters to facilitate asymptotically stability with respect to the predicted-future event using the tunable parameters and associated tunable ranges of the subset of tunable parameters. Activate the tuning scheme on tie lines and PCCs for each of the remaining interconnected microgrids in the PDS. The following aspects are intended to either individually or in combination, create one or more embodiments based on the one or more combination of aspects listed below.

According to aspects of the present disclosure, the simulation model first searches for samples with parameter combinations that initiates asymptotical stability at a predetermined post-event equilibrium point, and returns at least one sample having parameters combination that minimizes a Euclidean distance from the current parameters among all the generated samples, as well as the corresponding predetermined post-event equilibrium point. Wherein the simulation model includes predetermined post-event equilibrium points for the remaining microgrids, and a set of pre-designed equilibrium points of the interconnected microgrids that achieved asymptotically stability during a previous similar predicted-future event.

According to aspects of the present disclosure, the prioritizing of each parameter in the tunable parameters are ranked based on a relative distance between the current parameters before the predicted-future event and updated parameters determined for the post-disaster equilibrium points. It is possible that aspect can further comprise of determining an optimal set of reinforced parameters by prioritize each parameter in the tunable parameters according to a level of importance to the asymptotical stability of the PDS. Select a set of reinforced tunable parameters to be tuned, based on a comparison of the prioritized tunable parameters and a system reinforced stability model with a predetermined reinforced importance threshold. Such that the predetermined reinforced importance threshold is wider or greater than, the predefined importance threshold of the system stability model. Determine a reinforced tuning scheme for the optimal set of reinforced parameters to facilitate asymptotically stability with respect to the predicted-future event using the tunable parameters and associated tunable ranges of the optimal set of reinforced parameters. Activate the reinforced tuning scheme on the tie lines and the PCCs for each of the remaining interconnected microgrids in the PDS, when a desirable dynamic performance fails to be achieved using the tuning scheme that uses the tunable parameters and associated tunable ranges of the subset of tunable parameters. Wherein the information network includes a parameter identification and a tuning engine for microgrids, and the information network is in communication with a data gathering network having sensors, wherein the computing device includes a memory having a database with executable models associated with the PDS, and the computing device selectively executes steps stored in the memory. Further comprising: acquire monitoring data from the data acquisition network for the subset of interconnected microgrids entering island-mode in the PDS, due to the predicted-future event, along with the current tunable parameters and their associated tunable ranges in the PDS via the information network.

According to aspects of the present disclosure, the network parameters include series resistance, series reactance and series phase shift of a line compensator that is equipped on the tie line of one or more remaining microgrid, and shunt conductance and shunt susceptance of a bus compensator that is equipped at least one PCC of one or more remaining microgrid. Wherein, as aspect can include the control parameters having tracking time constants, and droop gains of a droop controller that is equipped at a PCC to regulate states of the PCC.

According to aspects of the present disclosure, can be that each parameter of the samples of the network and control parameter combinations are sampled by modeling the parameter as a randomized number uniformly distributed among the parameter tunable range between a lower bound and an upper bound, that was received from the information network. Wherein, it is possible that an aspect can further comprise of determining a post-event equilibrium point for the remaining microgrids, wherein the post-event equilibrium point for the remaining microgrids include voltage magnitudes and phase angles, active and reactive power injections for each PCC in the PDS. Wherein the post-event equilibrium point for the remaining microgrids is determined based on power flow studies with generation re-dispatch and load shedding against a set of predetermined network parameters, and the post-event equilibrium point is re-determined once there are changes on the network parameters. It is also possible that an aspect can further include determining an optimal parameter combination by first searching for parameter combinations from the samples of network and control parameter combinations that enable asymptotically stability at a determined post-event equilibrium point. Then, determining one parameter combination that has a minimal distance from the received current settings of the network parameters and the control parameters among all eligible network parameter and control parameter combinations.

According to aspects of the present disclosure, the selecting of the subset of tunable parameters to be tuned is accomplished by determine an optimal setting for the tunable parameters by finding a parameter combination having a minimal distance from current parameters among the samples of network and control parameter combinations that enable asymptotically stability at a determined post-event equilibrium point. Rank each parameter in the tunable parameters based on a relative distance between the received current setting and the determined optimal setting for the parameter. Choose a set of parameters with largest relative distances as the subset of tunable parameters to be tuned.

According to aspects of the present disclosure, the assessment of asymptotically stability at a predetermined equilibrium point with a given sample of parameter combination is achieved through checking the simulated evolution of PCC states with time, wherein the evolutions of states are simulated by iteratively solving a set of differential equations to represent the dynamics of PCC controls and a set of algebraic equations to represent power flows on the tie lines; wherein the asymptotical stability is verified if all states at PCCs stay close to the predetermined equilibrium point for any time within a predetermined window.

According to aspects of the present disclosure, the assessment of asymptotically stability at a predetermined equilibrium point with a given sample of parameter combination is achieved through checking a sum of square (SOS) condition, that is the equilibrium point of the PDS described as $\Delta\dot{\delta}_n = A_n \Delta\delta_n + B_n \phi(y_n)$, $y_n = C_n \Delta\delta_n$ with power flow induced nonlinearities $\phi(y_n)$, bounded by $r(\Delta\delta_n, \phi) \leq 0$, in the domain $\alpha(\Delta\delta_n) \leq 0$, is asymptotically stable in a fine domain, if there exists a polynomial $V(\Delta\delta_n)$ with $V(0)=0$, SOS polynomials $s_1(\Delta\delta_n, \phi)$ and $s_2(\Delta\delta_n, \phi)$, and strictly positive definite polynomials $\sigma_1(\Delta\delta_n)$ and $\sigma_2(\Delta\delta_n)$, such that $V(\Delta\delta_n) - \sigma_1$ $r(\Delta\delta_n)$ is SOS in $\Delta\delta_n$, and $-\nabla V(A_n\Delta\delta_n+B_n\phi)-\sigma_2+s_1^T r+s_2^T\alpha$ is SOS in $\Delta\delta_n$, and $\phi$, wherein $\Delta\delta_n$ is the vector of phase angle changes with respect to the phase angle values at post-event equilibrium point for all PCCs; $A_n$, $B_n$ and $C_n$ are system matrices defined by control parameters and network parameters of the PDS; $y_n$ is the vector of differences between phase angle changes at terminal PCCs of tie lines in the PDS.

According to aspects of the present disclosure, is that $\phi_{e_j}(y_{e_j})$ is the corresponding component for tie line $e_j$ of $\phi(y_n)$, $\phi_{e_j}(y_{e_j})=\sin(y_{e_j}+y_{e_j}^*)-\sin(y^*_{e_j})$; $y_{e_j}$ and $y_{e_j}$ are the corresponding component for tie line $e_j$ of $y_n$ and fixed reference defined based on corresponding phase angles of terminals of tie lines at the post-event equilibrium point; wherein $r_{e_j}(\Delta\delta_n, \phi_{e_j})$ is the corresponding component for tie line $e_j$ of $r(\Delta\delta_n, \phi)$, $r_{e_j}(\Delta\delta_n, \phi_{e_j})=(\phi_{e_j}(y_{e_j})-\eta_1(y_{e_j}))(\phi_{e_j})(y_{e_j})-\eta_2(y_{e_j}))$ and $\eta_1(y_{e_j})$ and $\eta_2(y_{e_j})$ are lower and upper polynomials for $\phi_{e_j}(y_{e_j})$, $$\eta_1(y_{e_j}) = (y_{e_j} + y_{e_j}^*) - \frac{1}{6}(y_{e_j} + y_{e_j}^*)^3 - \sin(y_{e_j}^*),$$

$$\eta_2(y_{e_j}) = (y_{e_j} + y_{e_j}^*) - \frac{1}{10}(y_{e_j} + y_{e_j}^*)^3 - \sin(y_{e_j}^*),$$

wherein $\alpha_{e_j}(\Delta\delta_n)$ is the corresponding component for tie line $e_j$ of $\alpha(\Delta\delta_n)$, $\alpha_{e_j}(\Delta\delta_n)=(y_{e_j}(\Delta\delta_n)+\pi+y_{e_j})(y_{e_j}(\Delta\delta_n)-\pi+y_{e_j})$.

According to aspects of the present disclosure, the assessment of asymptotically stability at a predetermined equilibrium point with a given sample of parameter combination is achieved through checking a linear matrix inequality (LMI) condition, that is the equilibrium point of the system described as $\Delta\dot\delta_n=A_n\Delta\delta_n+B_n\phi(y_n)$, $y_n=C_n\Delta\delta_n$ with power flow induced nonlinearities $\phi(y_n)$, bounded by $r(\Delta\delta_n, \phi)\leq 0$, in the domain $\alpha(\Delta\delta_n)\leq 0$, is asymptotically stable in a fine domain, if there exists a positive-definite matrix P, positive-semi-definite and diagonal matrices A and such that $$\begin{bmatrix} A_n^T P + PA_n & PB_n + A_n^T C_n^T \Lambda + C_n^T T \\ B_n^T P + \Lambda C_n A_n + TC_n & \Lambda C_n B_n + B_n^T C_n^T \Lambda - 2T \end{bmatrix} < 0,$$

wherein $\Delta\delta_n$ is the vector of phase angle changes with respect to the phase angle values at post-event equilibrium point for all PCCs; $A_n$, $B_n$ and $C_n$ are system matrices defined by control parameters and network parameters of the PDS; $y_n$ is the vector of differences between phase angle changes at terminal PCCs of tie lines in the PDS.

According to aspects of the present disclosure, is that $\phi_{e_j}(y_{e_j})$ is the corresponding component for tie line $e_j$ of $\phi(y_n)$, $\phi_{e_j}(y_{e_j})=\sin(y_{e_j}+y_{e_j}^*)-\sin(y^*_{e_j})$; $y_{e_j}$ and $y_{e_j}$ are the corresponding component for tie line $e_j$ of $y_n$ and fixed reference defined based on corresponding phase angles of terminals of tie lines at the post-event equilibrium point; wherein $r_{e_j}(\Delta\delta_n, \phi_{e_j})$ is the corresponding component for tie line $e_j$ of $r(\Delta\delta_n, \phi)$, $r_{e_j}(\Delta\delta, \phi_{e_j})=\phi_{e_j}(y_{e_j})(\phi_{e_j}(y_{e_j})-y_{e_j})$, wherein $\alpha_{e_j}(\Delta\delta_n)$ is the corresponding component for tie line $e_j$ of $\alpha(\Delta\delta_n)$, $\alpha_{e_j}(\Delta\delta)=(y_{e_j}(\Delta\delta+\pi+y_{e_j})(y_{e_j}(\Delta\delta_n)-\pi+y_{e_j})$.

According to aspects of the present disclosure, the one or more computing devices are communicatively linked to access a hardware memory, the hardware memory includes program instructions and forecasted event information.

Figure 9:
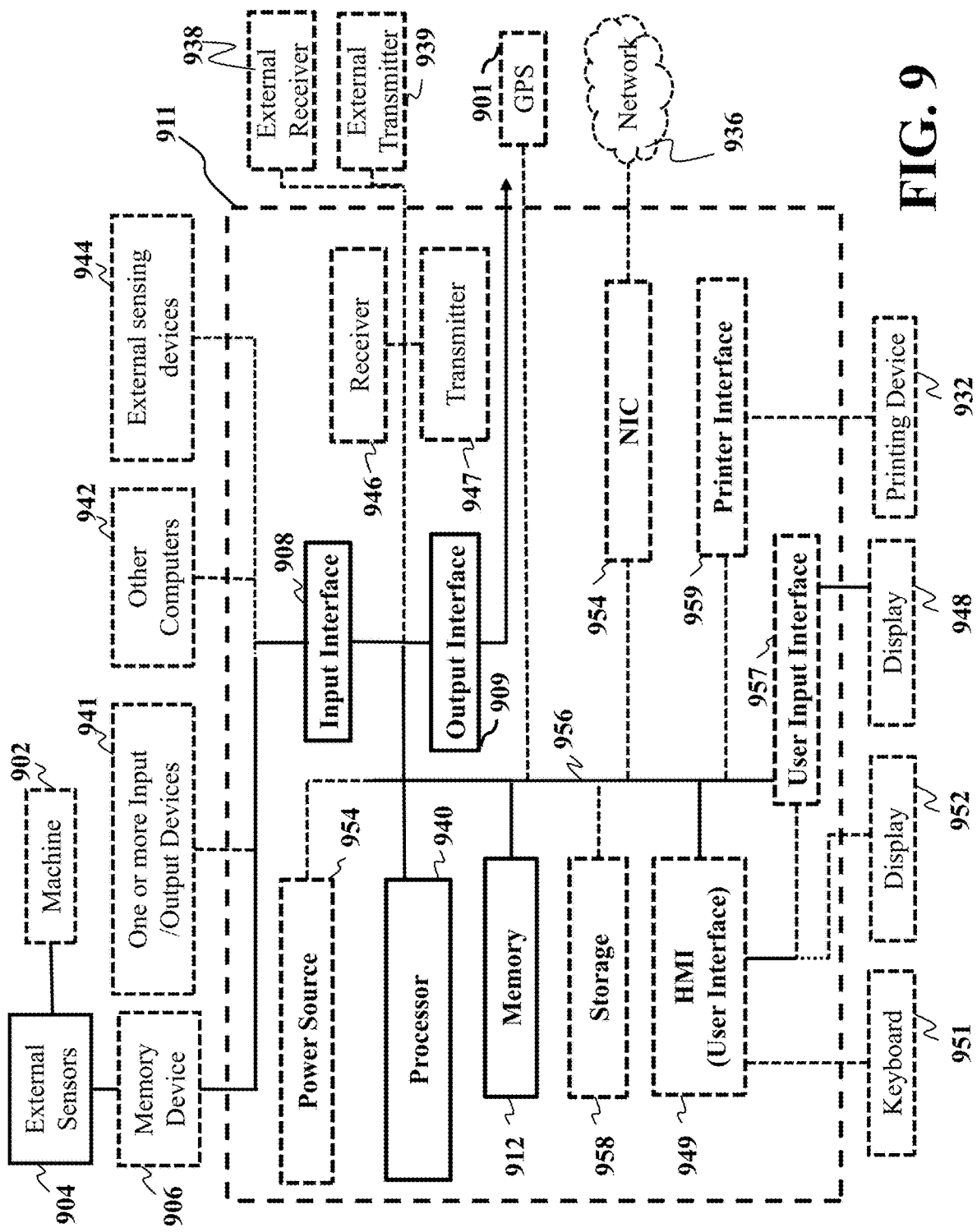
FIG. 9 is a block diagram illustrating the methods of FIG. 1A and FIG. 1B, that can be implemented using an alternate computer or processor, according to embodiments of the present disclosure.

FIG. 9 is a block diagram of illustrating the method of FIG. 1A, that can be implemented using an alternate computer or hardware processor, according to embodiments of the present disclosure. The computer 911 includes a hardware processor 940, computer readable memory 912, storage 958 and user interface 949 with display 952 and keyboard 951, which are connected through bus 956. For example, the user interface 949 in communication with the hardware processor 940 and the computer readable memory 912, acquires and stores the signal data examples in the computer readable memory 912 upon receiving an input from a surface, keyboard surface 951, of the user interface 949 by a user.

The computer 911 can include a power source 954, depending upon the application the power source 954 may be optionally located outside of the computer 911. Linked through bus 956 can be a user input interface 957 adapted to connect to a display device 948, wherein the display device 948 can include a computer monitor, camera, television, projector, or mobile device, among others. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 954 is adapted to connect through the bus 956 to a network 936, wherein time series data or other data, among other things, can be rendered on a third-party display device, third-party imaging device, and/or third-party printing device outside of the computer 911.

Still referring to FIG. 9, the signal data or other data, among other things, can be transmitted over a communication channel of the network 936, and/or stored within the storage system 958 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the parameter coordination systems/methods, power distribution system operation data, and historical power distribution system data of the same type as the power distribution system and other data relating to the parameter coordination of the power distribution system or similar types of power distribution systems as the power distribution system.

Further, the signal data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The computer 911 may be connected via an input interface 908 to external sensing devices 944 and external input/output devices 941. For example, the external sensing devices 944 may include sensors gathering data before-during-after of the collected signal data of the power distribution system. For instance, the disaster induced faulted line segments, and faulted types, and the fault impacted customers. The computer 911 may be connected to other external computers 942. An output interface 909 may be used to output the processed data from the hardware processor 940. It is noted that a user interface 949 in communication with the hardware processor 940 and the non-transitory computer readable storage medium 912, acquires and stores the region data in the non-transitory computer readable storage medium 912 upon receiving an input from a surface 952 of the user interface 949 by a user.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure.

Therefore, it is the aspect of the append claims to cover all such variations and modifications as come within the true spirit and scope of the present disclosure.

What is claimed is:

1. A system for coordinating parameters including network parameters and control parameters of a power distribution system (PDS), the PDS includes interconnected microgrids, each microgrid is connected through a point of common coupling (PCC), and each microgrid is connected with adjacent microgrids through tie lines, the system comprising:

a computing hardware system including computing devices communicatively linked to the PDS via an information network, wherein at least one computing device of the computing devices is configured to receive a predicted-future event and a subset of microgrids entering island-mode due to the predicted-future event, along with current tunable parameters and their associated tunable ranges in the PDS via the information network;

generate samples of network and control parameter combinations for the PDS that initiate asymptotical stability of the PDS, based on a comparison of the current tunable parameters and their associated tunable ranges and a simulation model with a predefined deviation threshold, to obtain tunable parameters;

prioritize each parameter in the tunable parameters according to a level of importance to the asymptotical stability of the PDS, and select a subset of tunable parameters to be tuned, based on a comparison of the prioritized tunable parameters and a system stability model with a predetermined importance threshold;

determine a tuning scheme for the subset of tunable parameters to facilitate asymptotically stability with respect to the predicted-future event using the tunable parameters and associated tunable ranges of the subset of tunable parameters; and activate the tuning scheme on tie lines and PCCs for each of the remaining interconnected microgrids in the PDS.

2. The system of claim 1, wherein the simulation model first searches for samples with parameter combinations that initiates asymptotical stability at a predetermined post-event equilibrium point, and returns at least one sample having parameters combination that minimizes a Euclidean distance from the current parameters among all the generated samples, as well as the corresponding predetermined post-event equilibrium point.

3. The system of claim 2, wherein the simulation model includes predetermined post-event equilibrium points for the remaining microgrids, and a set of pre-designed equilibrium points of the interconnected microgrids that achieved asymptotically stability during a previous similar predicted-future event.

4. The system of claim 1, wherein the prioritizing of each parameter in the tunable parameters are ranked based on a relative distance between the current parameters before the predicted-future event and optimal parameters determined for the post-disaster equilibrium points.

5. The system of claim 1, further comprising:
determine an optimal set of reinforced parameters by
prioritize each parameter in the tunable parameters according to a level of importance to the asymptotical stability of the PDS, and select a set of reinforced tunable parameters to be tuned, based on a comparison of the prioritized tunable parameters and a system reinforced stability model with a predetermined reinforced importance threshold, such that the predetermined reinforced importance threshold is wider or greater than, the predefined importance threshold of the system stability model;
determine a reinforced tuning scheme for the optimal set of reinforced parameters to facilitate asymptotically stability with respect to the predicted-future event using the tunable parameters and associated tunable ranges of the optimal set of reinforced parameters; and
activate the reinforced tuning scheme on the tie lines and the PCCs for each of the remaining interconnected microgrids in the PDS, when a desirable dynamic performance fails to be achieved using the tuning scheme that uses the tunable parameters and associated tunable ranges of the subset of tunable parameters.

6. The system of claim 1, wherein the information network includes a parameter identification and a tuning engine for microgrids, and the information network is in communication with a data gathering network having sensors, wherein the computing device includes a memory having a database with executable models associated with the PDS, and the computing device selectively executes steps stored in the memory.

7. The system of claim 6, further comprising:
acquire monitoring data from the data acquisition network for the subset of interconnected microgrids entering island-mode in the PDS, due to the predicted-future event, along with the current tunable parameters and their associated tunable ranges in the PDS via the information network.

8. The system of claim 1, wherein the network parameters include series resistance, series reactance and series phase shift of a line compensator that is equipped on the tie line of one or more remaining microgrid, and shunt conductance and shunt susceptance of a bus compensator that is equipped at least one PCC of one or more remaining microgrid.

9. The system of claim 1, wherein the control parameters include tracking time constants, and droop gains of a droop controller that is equipped at a PCC to regulate states of the PCC.

10. The system of claim 1, wherein each parameter of the samples of the network and control parameter combinations are sampled by modeling the parameter as a randomized number uniformly distributed among the parameter tunable range between a lower bound and an upper bound, that was received from the information network.

11. The system of claim 1, further comprising:
determine a post-event equilibrium point for the remaining microgrids, wherein the post-event equilibrium point for the remaining microgrids include voltage magnitudes and phase angles, active and reactive power injections for each PCC in the PDS.

12. The system of claim 11, wherein the post-event equilibrium point for the remaining microgrids is determined based on power flow studies with generation re-dispatch and load shedding against a set of predetermined network parameters, and the post-event equilibrium point is re-determined once there are changes on the network parameters.

13. The system of claim 1, further comprising:
determine an optimal parameter combination by first searching for parameter combinations from the samples of network and control parameter combinations that enable asymptotically stability at a determined post-event equilibrium point, and then determining one parameter combination that has a minimal distance from the received current settings of the network parameters and the control parameters among all eligible network parameter and control parameter combinations.

14. The system of claim 1, wherein the selecting of the subset of tunable parameters to be tuned is accomplished by
determine an optimal setting for the tunable parameters by finding a parameter combination having a minimal distance from current parameters among the samples of network and control parameter combinations that enable asymptotically stability at a determined post-event equilibrium point;
rank each parameter in the tunable parameters based on a relative distance between the received current setting and the determined optimal setting for the parameter; and
choose a set of parameters with largest relative distances as the subset of tunable parameters to be tuned.

15. The system of claim 1, wherein the assessment of asymptotically stability at a predetermined equilibrium point with a given sample of parameter combination is achieved through checking the simulated evolution of PCC states with time, wherein the evolutions of states are simulated by iteratively solving a set of differential equations to represent the dynamics of PCC controls and a set of algebraic equations to represent power flows on the tie lines; wherein the asymptotical stability is verified if all states at PCCs stay close to the predetermined equilibrium point for any time within a predetermined window.

16. The system of claim 1, wherein the assessment of asymptotically stability at a predetermined equilibrium point with a given sample of parameter combination is achieved through checking a sum of square (SOS) condition, that is the equilibrium point of the PDS described as $\Delta \dot{\delta}_n = A_n \Delta \delta_n + B_n \phi(y_n)$, $y_n = C_n \Delta \delta_n$ with power flow induced nonlinearities $\phi(y_n)$, bounded by $r(\Delta \delta_n, \phi) \leq 0$, in the domain $\alpha(\Delta \delta_n) \leq 0$, is asymptotically stable in a fine domain, if there exists a polynomial $V(\Delta \delta_n)$ with $V(0)=0$, SOS polynomials $s_1 (\Delta \delta_n, \phi))$ and $s_2 (\Delta \delta_n, \phi)$, and strictly positive definite polynomials $\sigma_1 (\Delta \delta_n)$ and $\sigma_2 (\Delta \delta_n)$, such that $V(\Delta \delta_n) - \sigma_1 (\Delta \delta_n)$ is SOS in $\Delta \delta_n$, and $-\nabla V(A_n \Delta \delta_n + B_n \phi) - \sigma_2 + s_1^T r + s_2^T a$ is SOS in $\Delta \delta_n$ and $\phi$, wherein $\Delta \delta_n$ is the vector of phase angle changes with respect to the phase angle values at post-event equilibrium point for all PCCs; $A_n$, $B_n$ and $C_n$ are system matrices defined by control parameters and network parameters of the PDS; $y_n$ is the vector of differences between phase angle changes at terminal PCCs of tie lines in the PDS.

17. The system of claim 16, wherein $\phi_{e_j}(y_{e_j})$ is the corresponding component for tie line $e_j$ of $\phi(y_n)$, $\phi_{e_j}(y_{e_j}) = \sin(y_{e_j} + y_{e_j}) - \sin(y_{e_j})$; $y_{e_j}$ and $y_{e_j}$ are the corresponding component for tie line $e_j$ of $y_n$ and fixed reference defined based on corresponding phase angles of terminal PCCs of tie lines at the post-event equilibrium point; wherein $r_{e_j}(\Delta \delta_n, \phi_{e_j})$ is the corresponding component for tie line $e_j$ of $r(\Delta \delta_n, \phi)$, $r_{e_j}(\Delta \delta, \phi_{e_j}) = (\phi_{e_j}(y_{e_j}) - \eta_1 (e_{e_j}))(\phi_{e_j}(y_{e_j}) - \eta_2 (y_{e_j}))$, and $\eta_1 (y_{e_j})$ and $\eta_2 (y_{e_j})$ are lower and upper polynomials for $$\phi_{e_j}(y_{e_j}), \eta_1(y_{e_j}) = (y_{e_j} + y_{e_j}^*) - \frac{1}{6}(y_{e_j} + y_{e_j}^*)^3 - \sin(y_{e_j}^*),$$

$$\eta_2(y_{e_j}) = (y_{e_j} + y_{e_j}^*) - \frac{1}{10}(y_{e_j} + y_{e_j}^*)^3 - \sin(y_{e_j}^*),$$

wherein $\alpha_{e_j}(\Delta\delta_n)$ is the corresponding component for tie line $e_j$ of $\alpha(\Delta\delta_n^j)$, $\alpha_{e_j}(\Delta\delta_n) = (y_{e_j}(\Delta\delta_n) + \pi + y_{e_j})(y_{e_j}(\Delta\delta_n) - \pi + y_{e_j})$.

18. The system of claim 1, wherein the assessment of asymptotically stability at a predetermined equilibrium point with a given sample of parameter combination is achieved through checking a linear matrix inequality (LMI) condition, that is the equilibrium point of the system described as $\Delta\dot{\delta}_n = A_n \Delta\delta_n + B_n \phi(y_n)$, $y_n = C_n \Delta\delta_n$ with power flow induced nonlinearities $\phi(y_n)$, bounded by $r(\Delta\delta_n, \phi)) \le 0$, in the domain $\alpha(\Delta\delta_n) \le 0$, is asymptotically stable in a fine domain, if there exists a positive-definite matrix P, positive-semi-definite and diagonal matrices $\Lambda$ and T, such that $$\begin{bmatrix} A_n^T P + P A_n & P B_n + A_n^T C_n^T \Lambda + C_n^T T \\ B_n^T P + \Lambda C_n A_n + T C_n & \Lambda C_n B_n + B_n^T C_n^T \Lambda - 2T \end{bmatrix} < 0,$$

wherein $\Delta\delta_n$, is the vector of phase angle changes with respect to the phase angle values at post-event equilibrium point for all PCCs; $A_n$, $B_n$, and $C_n$ are system matrices defined by control parameters and network parameters of the PDS; $y_n$, is the vector of differences between phase angle changes at terminal PCCs of tie lines in the PDS.

19. The system of claim 18, wherein $\phi_{e_j}(y_{e_j})$ is the corresponding component for tie line $e_j$ of $\phi(y_n)$, $\phi_{e_j}(y_{e_j}) = \sin(y_{e_j} + y^*_{e_j}) - \sin(y^*_{e_j})$;
$y_{e_j}$ and $y_{e_j}$ are the corresponding component for tie line $e_j$ of $y_n$ and fixed reference defined based on corresponding phase angles of terminals of tie lines at the post-event equilibrium point; wherein $r_{e_j}(\Delta\delta_n, \phi_{e_j})$ is the corresponding component for tie line $e_j$ of $r(\Delta\delta_n, \phi)$, $r_{e_j}(\Delta\delta, \phi_{e_j}) = \phi_{e_j}(y_{e_j})(\phi_{e_j}(y_{e_j}) - y_{e_j})$, wherein $\alpha_{e_j}(\Delta\delta_n)$ is the corresponding component for tie line $e_j$ of $\alpha(\Delta\delta_n)$, $\alpha_{e_j}(\Delta\delta) = (y_{e_j}(\Delta\delta_n) + \pi + y_{e_j})(y_{e_j}(\Delta\delta_n) - \pi + y_{e_j})$.

20. The system of claim 1, wherein the one or more computing devices are communicatively linked to access a hardware memory, the hardware memory includes program instructions and forecasted event information.

21. A system for coordinating parameters including network parameters and control parameters of a power distribution system (PDS), the PDS includes microgrids interconnected through a point of common coupling (PCC) via each microgrid, and each microgrid is connected with adjacent microgrids through tie lines, the system comprising;
an information network in communication with a data gathering network having sensors, a processor and a memory having a database including executable models associated with the PDS, wherein the processor selectively executes steps stored in the memory, such that the processor is configured to
receive a predicted-future event from the information network, and in response, acquire monitoring data from the data acquisition network for a list of microgrids entering island-mode in the PDS, due to the predicted-future event;
identify current adjustable parameters and their associated tunable ranges of the PDS, for inclusion in an execution of at least one simulation model, to create a system stability model;
generate samples of network and control parameter combinations that initiate asymptotical stability for the PDS based on a comparison of identified current adjustable parameters and their associated tunable ranges and the at least one simulation model with a predefined deviation threshold, to obtain tunable parameters;
prioritize each parameter in the tunable parameters according to a level of importance to the asymptotical stability of the PDS, then select a subset of tunable parameters to be tuned, based on a comparison of the prioritized tunable parameters and the system stability model with a predetermined importance threshold;
determine a tuning scheme for the subset of tunable parameters to facilitate asymptotically stability with respect to the predicted-future event using the adjustable parameters and associated tunable ranges of the subset of tunable parameters; and
activate the tuning scheme on tie lines and PCCs for each of the remaining interconnected microgrids in the PDS.

22. A method for coordinating parameters including network parameters and control parameters of a power distribution system (PDS), the PDS includes interconnected microgrids, each microgrid is connected through a point of common coupling (PCC), and each microgrid is connected with adjacent microgrids through tie lines, the method comprising:
receiving a predicted-future event and a subset of microgrids entering island-mode due to the predicted-future event, along with current tunable parameters and their associated tunable ranges in the PDS via the information network;
generating samples of network and control parameter combinations for the PDS that initiate asymptotical stability of the PDS, based on a comparison of the current tunable parameters and their associated tunable ranges and a simulation model with a predefined deviation threshold, to obtain tunable parameters;
prioritizing each parameter in the tunable parameters according to a level of importance to the asymptotical stability of the PDS, and select a subset of tunable parameters to be tuned, based on a comparison of the prioritized tunable parameters and a system stability model with a predetermined importance threshold;
determining a tuning scheme for the subset of tunable parameters to facilitate asymptotically stability with respect to the predicted-future event using the tunable parameters and associated tunable ranges of the subset of tunable parameters; and
activating the tuning scheme on tie lines and PCCs for each of the remaining interconnected microgrids in the PDS.

* * * * *